US007740540B2

(12) United States Patent
Inamura et al.

(10) Patent No.: US 7,740,540 B2
(45) Date of Patent: Jun. 22, 2010

(54) GAMING MACHINE

(75) Inventors: Yukinori Inamura, Tokyo (JP); Hiroshi Ito, Tokyo (JP); Hideaki Iwamoto, Tokyo (JP); Kaoru Kuroiwa, Tokyo (JP); Keiki Inoue, Tokyo (JP); Sakiko Kojima, Tokyo (JP); Akira Osawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1413 days.

(21) Appl. No.: 11/148,427

(22) Filed: Jun. 9, 2005

(65) Prior Publication Data

US 2005/0277461 A1 Dec. 15, 2005

(30) Foreign Application Priority Data

Jun. 11, 2004 (JP) .......................... P.2004-174646
Apr. 25, 2005 (JP) .......................... P.2005-126978

(51) Int. Cl.
*A63F 9/24* (2006.01)
*A63F 13/02* (2006.01)
*A63F 13/12* (2006.01)
*A63F 5/04* (2006.01)
*G07F 17/34* (2006.01)

(52) U.S. Cl. ............................ 463/31; 463/29; 463/42; 463/43

(58) Field of Classification Search ............. 463/29–31, 463/40–43, 16, 20; 715/201, 209, 210, 234, 715/235, 243–247, 253, 700, 703, 733, 744
See application file for complete search history.

(56) References Cited

U.S. PATENT DOCUMENTS 5,618,232 A * 4/1997 Martin ........................ 463/25
5,810,665 A 9/1998 Takemoto et al.
5,917,484 A * 6/1999 Mullaney .................... 715/703
6,219,836 B1 * 4/2001 Wells et al. ................. 717/178
6,322,309 B1 11/2001 Thomas et al.
6,347,996 B1 2/2002 Gilmore et al.
6,843,723 B2 * 1/2005 Joshi ........................... 463/25
6,939,226 B1 * 9/2005 Joshi ........................... 463/20
6,960,136 B2 * 11/2005 Joshi et al. ..................... 463/25
6,974,385 B2 * 12/2005 Joshi et al. ..................... 463/20
6,991,543 B2 * 1/2006 Joshi ........................... 463/35
2001/0039210 A1 * 11/2001 St-Denis ....................... 463/42
2001/0052910 A1 * 12/2001 Parekh et al. ............... 345/744
2002/0142825 A1 * 10/2002 Lark et al. .................... 463/16

(Continued)

FOREIGN PATENT DOCUMENTS

CN 1142782 A 12/1997

(Continued)

*Primary Examiner*—Peter DungBa Vo
*Assistant Examiner*—Matthew D. Hoel
(74) *Attorney, Agent, or Firm*—Leydig, Voit & Mayer, Ltd.

(57) ABSTRACT

A gaming machine, having a display unit that displays a game image for use in a game, including: an image data storage unit that stores common image data that is common to user countries in which the gaming machine is used and individual image data that differ from user country to user country; and a position changing unit that changes the display position of the game image displayed on the display unit, on a per user country basis, using the common image data and the individual image data, stored in the image data storage unit.

1 Claim, 20 Drawing Sheets

115

| IDENTIFICATION CODE (115a) | DISPLAY PATTERN (115b) |
|---|---|
| a | INDIVIDUAL IMAGE 212a IS DISPOSED ON UPPER SIDE OF COMMON IMAGE. |
| b | INDIVIDUAL IMAGE 212a IS DISPOSED ON LOWER SIDE OF COMMON IMAGE. |
| c | INDIVIDUAL IMAGE 212a IS DISPOSED ON UPPER SIDE OF COMMON IMAGE, AND INDIVIDUAL IMAGE 212b IS DISPOSED ON LEFT SIDE THEREOF. |
| d | INDIVIDUAL IMAGE 212a IS DISPOSED ON LOWER SIDE OF COMMON IMAGE, AND INDIVIDUAL IMAGE 212b IS DISPOSED ON RIGHT SIDE THEREOF. |
| e | INDIVIDUAL IMAGE 212a AND 212c ARE DISPOSED ON UPPER AND LOWER SIDES OF COMMON IMAGE. |
| f | INDIVIDUAL IMAGE 212a AND 212c ARE SEQUENTIALLY DISPOSED ON LOWER SIDE OF COMMON IMAGE. |

U.S. PATENT DOCUMENTS

2002/0142846 A1* 10/2002 Paulsen ........................ 463/43
2002/0147049 A1* 10/2002 Carter, Sr. ..................... 463/42
2002/0151366 A1* 10/2002 Walker et al. ................. 463/42
2002/0174150 A1* 11/2002 Dang et al. ................. 707/536
2003/0069070 A1 4/2003 Alcorn et al.
2004/0106446 A1 6/2004 Cannon et al.
2004/0180721 A1* 9/2004 Rowe .......................... 463/42
2005/0277461 A1 12/2005 Inamura et al.

FOREIGN PATENT DOCUMENTS

CN 1706529 12/2005
DE 100 26 366 1/2001
WO WO 00/32286 6/2000

* cited by examiner

110

| IDENTIFICATION CODE (110a) | INDIVIDUAL IMAGE DATA (110b) |
|---|---|
| a | 112a |
| b | 112a |
| c | 112a, 112b |
| d | 112a, 112b |
| e | 112a, 112c |
| f | 112a, 112c |

FIG. 18

115

115a 115b

| IDENTIFICATION CODE | DISPLAY PATTERN |
| --- | --- |
| a | INDIVIDUAL IMAGE 212a IS DISPOSED ON UPPER SIDE OF COMMON IMAGE. |
| b | INDIVIDUAL IMAGE 212a IS DISPOSED ON LOWER SIDE OF COMMON IMAGE. |
| c | INDIVIDUAL IMAGE 212a IS DISPOSED ON UPPER SIDE OF COMMON IMAGE, AND INDIVIDUAL IMAGE 212b IS DISPOSED ON LEFT SIDE THEREOF. |
| d | INDIVIDUAL IMAGE 212a IS DISPOSED ON LOWER SIDE OF COMMON IMAGE, AND INDIVIDUAL IMAGE 212b IS DISPOSED ON RIGHT SIDE THEREOF. |
| e | INDIVIDUAL IMAGE 212a AND 212c ARE DISPOSED ON UPPER AND LOWER SIDES OF COMMON IMAGE. |
| f | INDIVIDUAL IMAGE 212a AND 212c ARE SEQUENTIALLY DISPOSED ON LOWER SIDE OF COMMON IMAGE. |

FIG. 20

120

| IDENTIFICATION CODE (120a) | CORRESPONDING REGION (120b) |
|---|---|
| a | 4b1 |
| b | 4b2 |
| c | 4b1, 4b3 |
| d | 4b2, 4b4 |
| e | 4b1, 4b2 |
| f | 14b3, 4b4 |

GAMING MACHINE

CROSS-REFERENCE TO THE RELATED APPLICATION(S)

This application is based upon and claims priority from Japanese Patent Applications 2004-174646 filed on Jun. 11, 2004 and 2005-126978 filed on Apr. 25, 2005, the entire contents of which are incorporated herein by reference.

BACKGROUND OF THE INVENTION

1. Field of the Invention

The present invention relates to a gaming machine which includes a display unit that displays an image for use in a game, such as a liquid crystal display device, and in which the game proceeds using the image displayed on the display unit.

2. Description of the Related Art

Conventionally, there is a gaming machine which includes a display unit that displays an image for use in a game (a game image), such as a liquid crystal display device, and in which the game proceeds using the image displayed on the display unit. As the gaming machine of this type, for example, there are the following gaming machines: a gaming machine that is operated by a player to rotate or scroll reels (hereinafter called "pseudo-reels") displayed as images on the liquid crystal display device, thus performing variable display (which gaming machine is a so-called video slot machine), and a gaming machine such that card images showing cards are displayed and, in accordance with player's operational entry, display of the card images is changed to allow a game to proceed (which gaming machine is also called a card gaming machine). In the video slot machine out of these gaming machines, winning or losing of the game and a mode in which the game is won (winning mode) are determined from a combination of symbols (hereinafter called a "symbol combination") falling on a predetermined valid line (pay line) when the reels are stopped, and payout of media for use in the game, such as medals and coins, (hereinafter called "coins") is performed in response to the winning mode.

For example, JP-A-2002-537874 discloses a gaming machine capable of performing a video simulation as rotating reels are displayed on a display unit.

As in the aforesaid conventional gaming machines, a gaming machine, which includes a display unit that displays a game image and in which a game proceeds using the game image displayed on the display unit, is in most cases configured such that image data for displaying the game image is stored in a storage unit such as an image ROM and is read therefrom to display the game image on the display unit.

However, because of the regulations of a country in which to install and use the gaming machine, laws, rules and the needs of the market, the specification (mainly the layout) of the image game sometimes varies from country to country, in which case there is the following problem. That is, it is required that the gaming machines of this type be broken out according to country in which to use them (hereinafter called "user countries", e.g., the United States and Australia) and that image data that meets the specification of each user country be generated and stored into the storage unit for each of the gaming machines. In other words, an each country's individualized response is required, such that image data are generated and stored according to different specifications for different countries, which contributes to the requirement of time and cost to develop the gaming machine.

Besides, there is a need of, on the one hand, an individualized response not only for each country but also for each state, province, district, etc. and, on the other hand, an individualized response for each month, season, year, etc.

SUMMARY OF THE INVENTION the invention has been made to solve the aforesaid problems, and an object of the invention is to provide a gaming machine which includes a display unit that displays a game image for use in a game and in which the game proceeds using the game image displayed on the display unit, wherein an individualized response to the game image for each of operation environments, such as a gaming machine installation site, installation time, and operation start time, is eliminated to shorten a development period and reduce cost.

To solve the aforesaid problem, according the invention, there is provided a gaming machine, having a display unit that displays a game image for use in a game, including: an image data storage unit that stores general game image data including common image data that is common to a plurality of user countries in which to use the gaming machine and individual image data that differ from user country to user country; and a position changing unit that changes the display position of the game image displayed on the display unit, on a per user country basis, using the general game image data stored in the image data storage unit.

This gaming machine is configured such that, when user countries are designated, the display position of the game image is changed, for each of the designated user countries, using the general game image data stored in the image data storage unit.

Further, according to the invention, there is provided a gaming machine, having a display unit that displays a game image for use in a game, including: an image data storage unit that stores common image data that is common to a plurality of user countries in which to use the gaming machine and individual image data that differ from user country to user country; and a layout changing unit that changes the display layout of the game image displayed on the display unit, using the common image data and any one of the individual image data, stored in the image data storage unit.

This gaming machine is configured such that, when any one of the individual image data stored in the image data storage unit is designated, the display layout of the game image is changed using the designated one of the individual image data and the common image data.

Besides, the invention provides a gaming machine, having a display unit that displays a game image for use in a game, including: an image data storage unit that stores common image data that is common to a plurality of user countries in which to use the gaming machine and individual image data that differ from user country to user country; a reading unit that reads a user country code for identifying each of the user countries from an external storage medium storing the user country code; and a layout setting unit that sets the display layout of the game image, on a per user country basis, using the common image data stored in the image data storage unit and any one of the individual image data corresponding to the user country code read by the reading unit.

This gaming machine, which can use the external storage medium to input a user country code from the external, is configured such that the display layout of the game image is changed using the common image data and individual image data corresponding to the user country code.

Further, according to the invention, there is provided a gaming machine having a display unit that displays a game image for use in a game, including: an image data storage unit that stores common image data for displaying on the display unit a common image which is common to a plurality of operation environments of the gaming machine and a plurality of individual image data for displaying on the display unit a plurality of individual images which are individually used for each of the operation environments of the gaming machine; an operation unit capable of performing the operation of entering identification information for specifying any of the operation environments; a specification unit that specifies at least one corresponding individual image data which corresponds to the identification information entered by the operation of the operation unit, out of the plurality of individual image data; a determination unit that determines a positional relationship, on the display unit, between the common image and a corresponding individual image based on the corresponding individual image data, in response to the identification information entered by the operation of the operation unit; and a display control unit that displays the game image in accordance with the positional relationship determined by the determination unit.

In this gaming machine, when identification information is entered by operation of the operation unit, corresponding individual image data which corresponds to the entered identification information, out of the individual image data stored in the image data storage unit, is specified. Besides, a positional relationship between the common image and a corresponding individual image which corresponds to the corresponding individual image data is determined. Thus, the game image is displayed to have the common image and the corresponding individual image, in accordance with the determined positional relationship.

Besides, the invention provides a gaming machine having a display unit that displaying a game image for use in a game, including: a display mode storage unit that stores a plurality of display modes in which to display, on the display unit, a common image which is common to a plurality of operation environments of the gaming machine and at least any one of a plurality of individual images which are individually used for each of the operation environments of the gaming machine; an operation unit capable of performing the operation of entering identification information for specifying any of the operation environments; a mode specification unit that specifies a corresponding display mode which corresponds to the identification information entered by the operation of the operation unit, out of the plurality of display modes; and a display control unit that displays the game image in accordance with the corresponding display mode specified by the mode specification unit.

In this gaming machine, when identification information is entered through the operation unit, a corresponding display mode which corresponds to the entered identification information, out of the display modes stored in the display mode storage unit, is specified. Thus, the game image is displayed in accordance with the specified corresponding display mode.

Furthermore, the invention provides a gaming machine having a display unit that displaying a game image for use in a game, including: a display control unit that performs display control of the display unit so as to secure in the display unit a common region capable of displaying a common image which is common to a plurality of operation environments of the gaming machine and position adjustment regions for use in adjusting the display position of the common image; and an operation unit capable of performing the operation of entering identification information for specifying any of the operation environments, wherein the display control unit displays at least any one of individual images in a corresponding region which corresponds to the identification information entered by the operation of the operation unit, out of the position adjustment regions, and displays the common image in the common region or in a region other than the common region and the corresponding region of the position adjustment regions.

In this gaming machine, the common region and the position adjustment regions are secured in the display unit. And, when identification information is entered through the operation unit, a corresponding region which corresponds to the entered identification information, out of the position adjustment regions, is specified. Thus, at least any one of the individual images is displayed in the specified corresponding region, whereas the common image is displayed in the common region or in a region other than the common region and the corresponding region of the position adjustment regions.

As described in detail above, according to the invention, in a gaming machine which includes a display unit that displays a game image and in which a game proceeds using the game image displayed on the display unit, an each country's individualized response to the game image is eliminated, thus making it possible to shorten a development period and reduce cost.

As described in detail above, according to the invention, in a gaming machine which includes a display unit that displays a game image and in which a game proceeds using the game image displayed on the display unit, an individualized response to the game image for each of operation environments, such as a gaming machine installation site, installation time, and operation start time, is eliminated, thus making it possible to shorten a development period and reduce cost.

BRIEF DESCRIPTION OF THE DRAWINGS

These and other objects and advantages of the present invention will be more fully apparent from the following detailed description taken in conjunction with the accompanying drawings, in which:

FIGS. 14A and 14B are diagrams showing data and a table that are stored in a program ROM and a ROM, wherein FIG. 14A shows common image data and individual image data that are stored in the program ROM and FIG. 14B shows a specification table;

FIGS. 15A and 15B are diagrams each showing the positional relationship between images displayed on a lower image display panel, wherein FIG. 15A shows that an individual image is disposed on the upper side of a common image and FIG. 15B shows that the individual image is disposed on the lower side of the common image;

FIGS. 16A and 16B are diagrams each showing the positional relationship between the images displayed on the lower image display panel, wherein FIG. 16A shows that the individual images are disposed on the upper and left sides of the common image and FIG. 16B shows that the individual images are disposed on the lower and right sides of the common image;

FIGS. 17A and 17B are diagrams each showing the positional relationship between the images displayed on the lower image display panel, wherein FIG. 17A shows that the individual images are disposed on the upper and lower sides of the common image and FIG. 17B shows that the individual images are sequentially disposed on the lower side of the common image;

FIG. 18 is a diagram showing a display pattern table;

FIGS. 19A to 19C are diagrams each showing a positional relationship between a common region and position adjustment regions on the lower image display panel, wherein FIG. 19A shows that the position adjustment regions are disposed around the common region, FIG. 19B shows that the position adjustment regions are disposed on both the left and right sides of the common region, and FIG. 19C shows that the individual images are disposed on the upper and lower sides of the common image; and FIG. 20 is a diagram showing a position specification table.

DETAILED DESCRIPTION OF THE PREFERRED EMBODIMENTS

Figure 1:
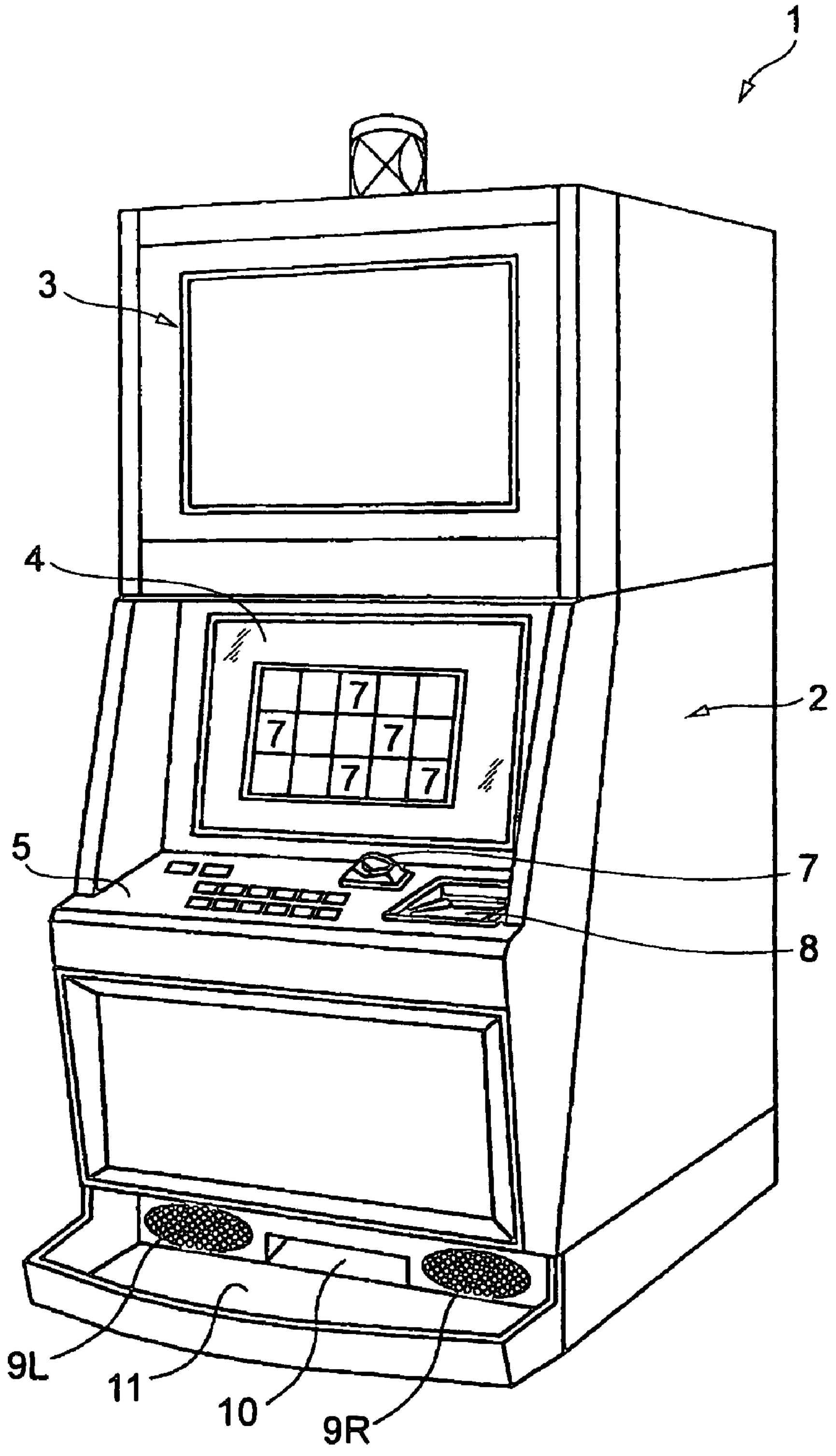
FIG. 1 is a perspective view showing the overall configuration of a slot machine that is a gaming machine according to an embodiment of the invention.

An embodiment of the invention will be described below, wherein like reference numerals are used to indicate like components, thus omitting redundant description.

In the embodiment, the following slot machine 1 will be described as an example of the case in which the invention is applied to a gaming machine having a display unit that displays a game image for use in a game.

(Overall Configuration of Slot Machine)

FIG. 1 is a perspective view showing the overall configuration of the slot machine 1. The slot machine 1, which is a gaming machine according to the embodiment of the invention, includes a display unit that displays a game image for use in a game. Displayed on the display unit are variable display images (reel images) that, showing an arrangement of a plurality of (five) reels each having a plurality of symbols, are as if the reels scroll. This slot machine 1 is a video slot machine capable of performing a slot game at which the amount of payouts is determined from a symbol combination that is made when the reels displayed on the display unit (the reels displayed as images are also called "pseudo-reels") are stopped.

The slot machine 1, having a cabinet 2, includes on the front side of the cabinet 2, from the top down, an upper image display panel 3 and a lower image display panel 4. The upper image display panel 3, configured of a liquid crystal display device, displays an image (e.g., an explanation of the game) such as not being directly involved in the game. And, the configuration is such that the image displayed on the upper image display panel 3 varies according to operational contents.

The lower image display panel 4, disposed substantially in the vertical center of the cabinet 2, is configured of a not-shown liquid crystal display device. This lower image display panel 4, which is the display unit of the invention, is configured to display the game image including the reel images.

And, a control panel 5 is disposed below the lower image display panel 4. Provided on the right side of the control panel 5 are a coin insertion slot 7 for inserting game media for use in the game, such as medals and coins, (hereinafter called "coins") and a bill insertion slot 8 that, provided for a player to insert bills, has a bill insertion sensor 8*a* (see FIG. 3) that outputs a signal indicative of bill insertion. Furthermore, the slot machine 1 has, at the bottom of the cabinet 2, a coin payout opening 10 and a coin receiving tray 11 that receives coins paid out. And, speakers 9L and 9R are disposed on the right and left of the coin payout opening 10.

Figure 2:
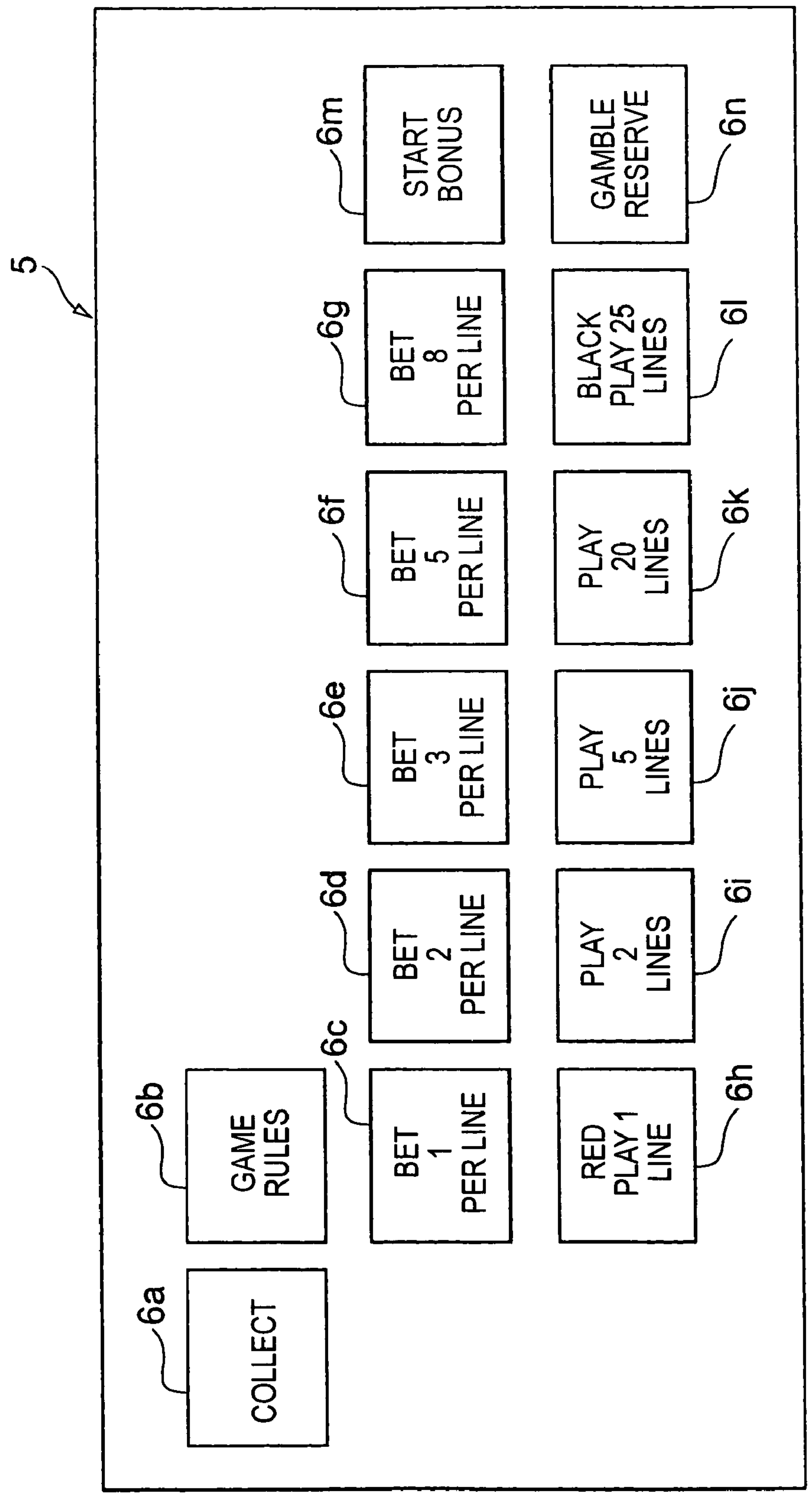
FIG. 2 is a front view showing the disposal of buttons on a control panel.

The control panel 5 has 14 buttons 6*a* to 6*n* that, shown in FIG. 2, are substantially similar to those of the well-known video slot machine. The control panel 5 has two buttons at the upper left: a collect button (COLLECT) 6*a* for determining coins won at the game and a game rule button (GAME RULES) 6*b*. The other buttons, disposed on the control panel 5 to form two rows below the collect button 6*a* and game rule button 6*b*, have five bet buttons 6*c* to 6*g* for determining the number of coins bet (the number of bets), five line buttons 6*h* to 6*l* for determining the number of lines, a start bonus button (START BONUS) 6*m* for starting a bonus game, and a gamble button (GAMBLE) 6*n* for determining the transition to a double game at the end of the bonus game.

(Internal Configuration of Slot Machine)

Figure 3:
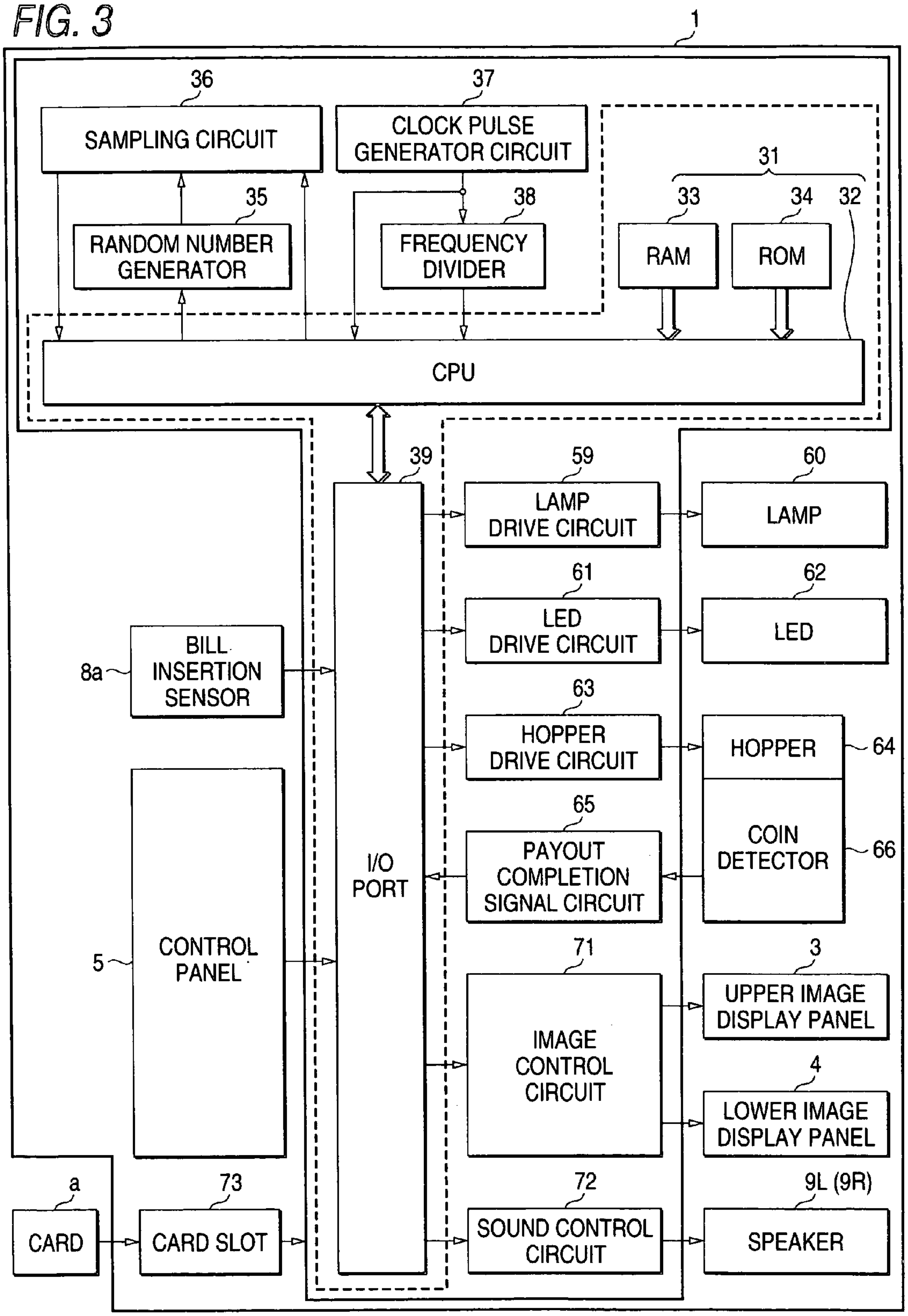
FIG. 3 is a block diagram of the slot machine showing mainly the internal configuration thereof.

FIG. 3 is a block diagram of the slot machine 1, showing mainly the internal configuration thereof. The slot machine 1 has a plurality of components around a microcomputer 31. The slot machine 1 has the microcomputer 31, a random number generator 35, a sampling circuit 36, a clock pulse generator circuit 37, and a frequency divider 38. Besides, the slot machine 1 has a lamp drive circuit 59, an LED drive circuit 61, a hopper drive circuit 63, a payout completion signal circuit 65, an image control circuit 71, and a sound control circuit 72.

The microcomputer 31 has a CPU (Central Processing Unit) 32, a RAM (Random Access Memory) 33, and a ROM (Read Only Memory) 34. The CPU 32 operates in accordance with, programs stored in the ROM 34 and also performs input/output of signals to/from the other components via an I/O port 39 and operational control of the entire slot machine 1. Data and programs to be used when the CPU 32 operates are stored in the RAM 33. For example, random numbers sampled by the to-be-described sampling circuit 36 are temporarily held in the RAM 33 after the game starts, and the code numbers and symbol numbers of the pseudo-reels are stored in the RAM 33. Programs to be executed by the CPU 32 and permanent data are stored in the ROM 34.

The random number generator 35 is operated in accordance with instructions of the CPU 32 to generate a predetermined range of random numbers. In accordance with the instructions of the CPU 32, the sampling circuit 36 selects an arbitrary random number from the random numbers generated by the random number generator 35 and inputs the selected random number to the CPU 32. The clock pulse generator circuit 37 generates a reference clock for operating the CPU 32, and the frequency divider 38 inputs to the CPU 32 a signal obtained as the reference clock is divided by a predetermined frequency.

The lamp drive circuit 59 outputs to a lamp 60 a signal for turning on the lamp 60 and blinks the lamp 60 during execution of the game. Game effects are carried out by this blinking. The LED drive circuit 61 controls flashing display of an LED 62. The LED 62 performs display of the number of credits, the number of coins won, etc. The hopper drive circuit 63 drives a hopper 64 in accordance with the control of the CPU 32, and the hopper 64 performs an operation for paying out coins and thus pays out the coins onto the coin receiving tray 11.

A coin detector 66 measures the number of coins paid out by the hopper 64 and notifies the payout completion signal circuit 65 of data of the measured number of coins. The payout completion signal circuit 65 inputs the data of the number of coins from the coin detector 66 and, when the inputted number of coins reaches data of a set number of coins, inputs to the CPU 32 a signal indicative of coin payout completion.

The image control circuit 71, which is the position changing unit, a layout changing unit, and a layout setting unit of the invention, controls image display on each of the upper and lower image display panels 3 and 4, and performs changing of the display position of and setting or changing of the display layout of the game image on the lower image display panel 4, thus displaying the game image on the lower image display panel 4.

Figure 4:
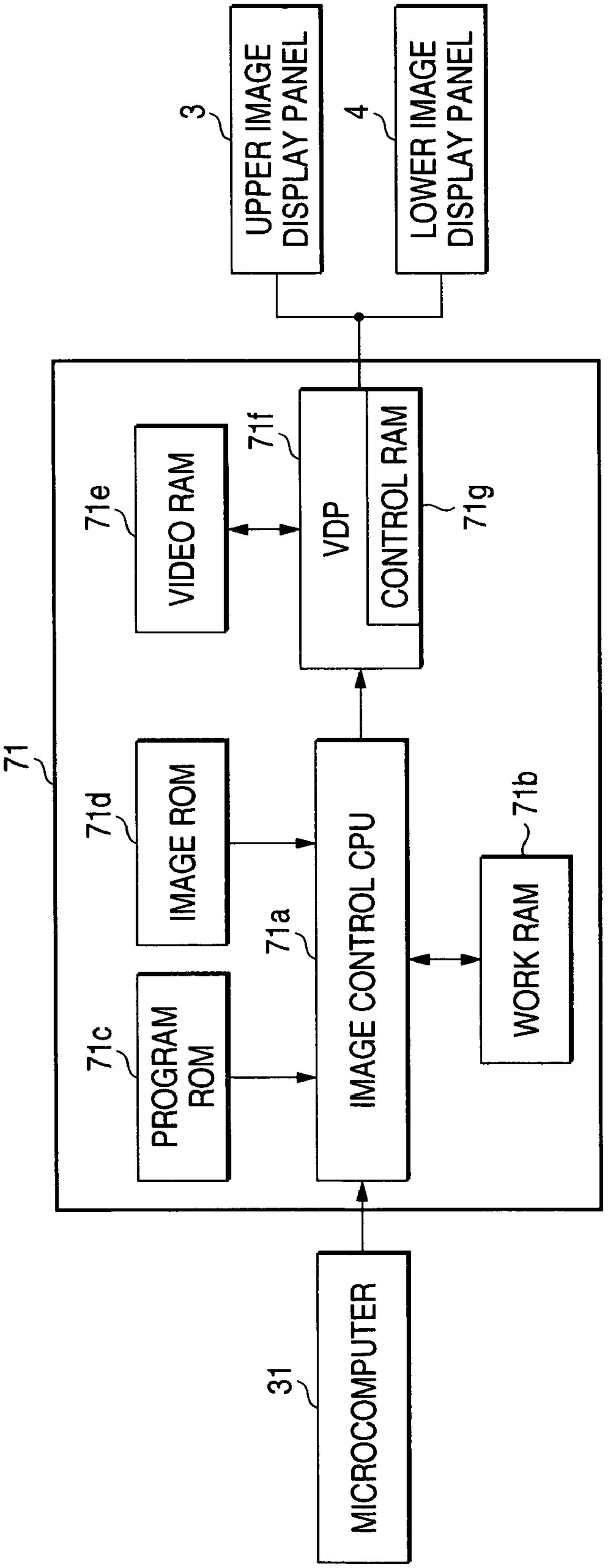
FIG. 4 is a block diagram showing an image control circuit.

As shown in FIG. 4, the image control circuit 71 has an image control CPU 71*a*, a work RAM 71*b*, a program ROM 71*c*, an image ROM 71*d*, a video RAM 71*e*, and a VDP (Video Display Processor) 71*f*. Based on a parameter that, including a to-be-described user country code, is set by the microcomputer 31, the image control CPU 71*a*, in accordance with an image control program pre-stored in the program ROM 71*c*, determines an image to be displayed on the upper image display panel 3, and performs changing of the display position of and setting or changing of the display layout of the game image, thus determining an image to be displayed on the lower image display panel 4. The work RAM 71*b* is configured to serve as a temporary storage unit when the image control CPU 71*a* executes the image control program.

The program ROM 71*c* stores the image control program, various selection tables, etc. The image ROM 71*d*, which is the image data storage unit of the invention, stores dot data for forming an image. In the case of the embodiment, general game image data is included in this dot data. This general game image data includes: common image data for use in image display whose content is common to a plurality of user countries (e.g., Australia and the United States) in which to use the slot machine 1; and individual image data for use in each user country's individualized image display.

For example, when the user countries are Australia and the United States, the general game image data is configured in the follow manner. In the lower image display panel 4, when an image displayed using the common image data is assigned to a game region 91*a* and images displayed using the individual image data of Australia and the United States are assigned to respective country-specific regions 91*b* and 91*c*, the general game image data has all the image data required to display the game region 91*a*, country-specific region 91*b*, and country-specific region 91*c*.

When such general game image data is used to display the game image on the lower image display panel 4, in accordance with the instructions of the CPU 32, the image control circuit 71 (image control CPU 71*a*) changes the display position of the game image, based on the user country code. By such changing of the display position, for example, the game image displayed on the lower image display panel 4 as shown in FIG. 6B is displayed with the display position changed as shown in FIG. 6C, i.e., with the display position shifted upward.

Besides, when the general game image data is used to display the game image, the display layout of the game image may be set in the following manner. That is, out of the general game image data, the common image data of the game region 91*a* and the individual image data of the country-specific region 91*b* are used to perform image display on the lower image display panel 4, thus displaying the game image with the layout as shown in FIG. 6B (which is an example of a slot machine for Australia). On the other hand, the common image data and the individual image data of the country-specific region 91*c* are used to perform image display on the lower image display panel 4, thus displaying the game image with the layout as shown in FIG. 6C (which is an example of a slot machine for the United States). Such setting of the display layout is performed by the image control circuit 71 (image control DPU 71*a*) in accordance with the instructions of the CPU 32 (the detail of which is described later).

Figure 6A:
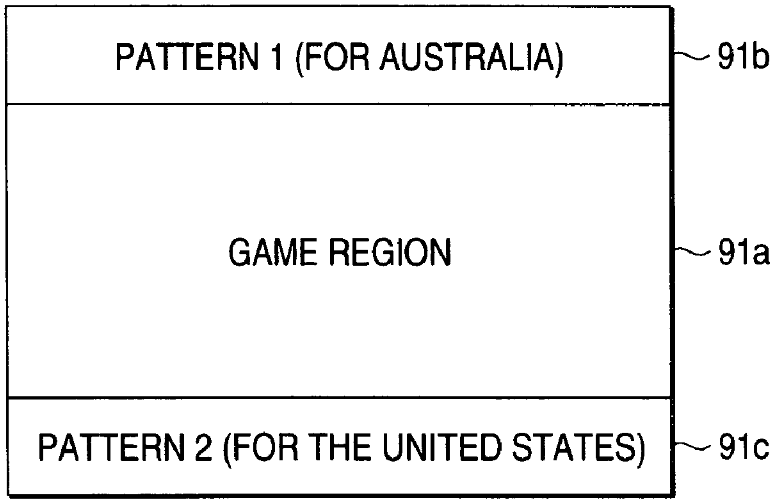
FIG. 6A is a diagram showing a display layout made by assuming that image display is performed using common image data and individual image data of two country-specific regions.
Figure 6B:
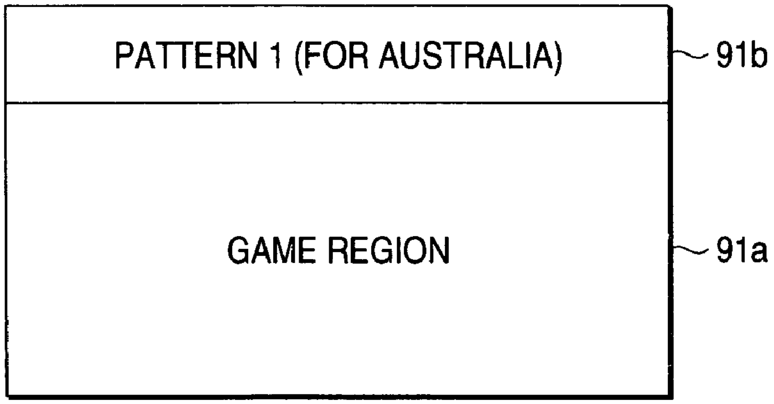
FIG. 6B is a diagram showing the display layout of a game image using the common image data and the individual image data of one country-specific region.
Figure 6C:
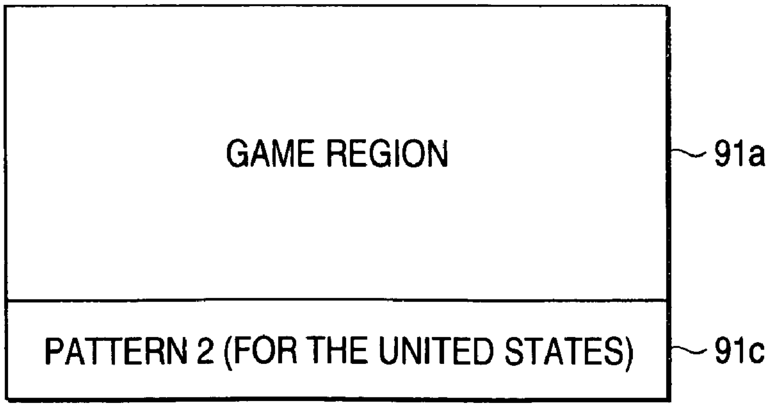
FIG. 6C is a diagram showing the display layout of a game image using the common image data and the individual image data of another country-specific region.

Additionally, FIG. 6A shows the display layout made by assuming that image display is performed using the common image data of the game region 91*a* and the individual image data of the country-specific regions 91*a* and 91*c*. With such a display layout, the game image is not displayed on the lower image display panel 4.

The video RAM 71*e* is configured to serve as a temporary storage unit when the VDP 71*f* forms an image. The VDP 71*f*, having a control RAM 71*g*, forms individual images for the upper and lower image display panels 3 and 4, which images are determined by the image control CPU 71*a*, and outputs the formed individual images to the upper and lower image display panels 3 and 4.

Besides, the slot machine 1 is provided with a card slot 73. This card slot 73, which is the reading unit of the invention, is configured to read the to-be-described user country code from a media card a that is an external storage medium storing thereon the user country code for identifying each of the user countries and thus to input the read user country code to the CPU 32.

The embodiment is configured such that the user country code is stored on the media card a and such that changing of the display position, etc. of the game image are performed based on the user country code read from the media card a. Alternatively, the configuration may be such that reference information (e.g., the serial number of a slot machine) serving as a reference when changing of the display position, etc. are performed is pre-stored on the media card a and such that changing of the display position, etc. of the game image are performed based on the reference information. By so doing, the display position can be changed as slot machines for one user country are distinguished from those for another by serial number, such e.g. that slot machines of serial numbers 1 to 100 are for Australia and slot machines of serial numbers 101 to 200 are for the United States.

The sound control circuit 72 inputs a sound signal from a sound source IC, amplifies the inputted sound signal, and then outputs a sound from the speakers 9L and 9R. Thereby, for example, a sound for boosting the game mood at a proper time after the game starts is outputted from the speakers 9L and 9R.

(Operational Contents of Slot Machine)

The operational contents of the slot machine 1 having the aforesaid configuration will now be described with reference to the flowchart shown in FIG. 5. The slot machine 1 according to the embodiment performs a game in a special game mode in addition to a normal game mode for performing a normal game. And, the configuration is such that the normal game is performed when the game mode is in the normal game mode, whereas the bonus game advantageous to the player is executed when the game mode makes the transition to the special game mode.

Figure 5:
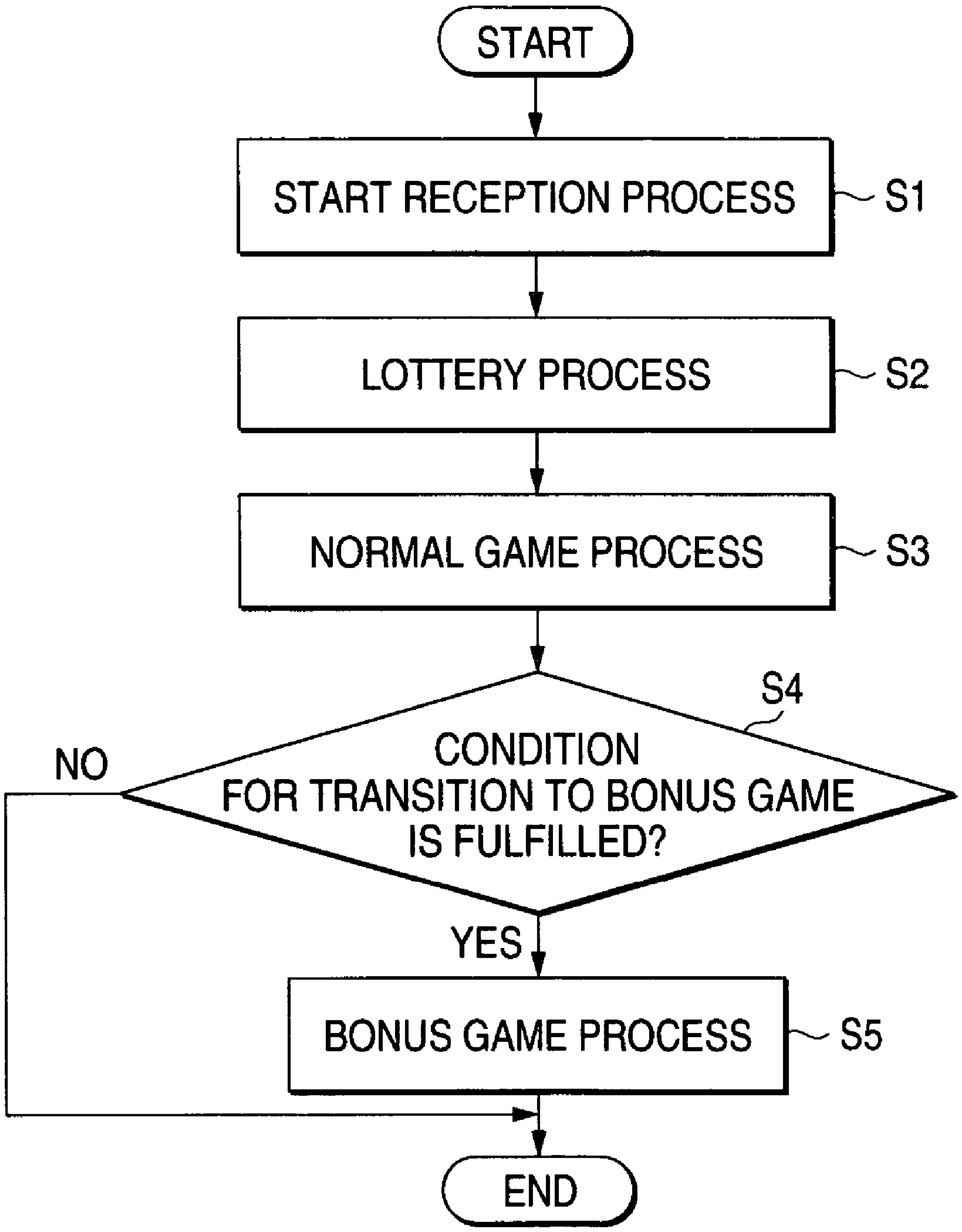
FIG. 5 is a flowchart showing the operational procedure of a main process of the slot machine ranging from start to end of a game.

FIG. 5 is a flowchart showing the operational procedure of a main process of the slot machine 1 ranging from start to end of the game, with the procedure divided into blocks. In FIG. 5, the term "step" is abbreviated as S.

As shown in FIG. 5, when starting the main process, to start the game, in accordance with the control of the CPU 32, the slot machine 1 performs a start reception process at step 1 and performs a lottery process at subsequent step 2. Next, at step 3, the slot machine 1 performs a normal game process while maintaining the game mode in the normal game mode and then proceeds to step 4. At step 4, in response to the result of the lottery process at step 2, the CPU 32 determines whether a condition for the transition to the bonus game (transition condition) is fulfilled or not. Here, if the transition condition is fulfilled, the process proceeds to step 5, whereas, if not, the main process comes to an end. When the process proceeds to step 5, the CPU 32 causes the game mode to transition to the special game mode, thus performing a bonus game process. Thereafter, the main process comes to an end.

In the slot machine 1, as it has the aforesaid configuration, in this series of process steps, in accordance with the instructions of the CPU 32, the image control circuit 71 operates as the position changing unit, a layout changing unit, or a layout setting unit of the invention, thus displaying the game image on the lower image display panel 4.

Before starting the execution of step 1 (i.e., which here assumes a stage before the game is performed on the slot machine 1, e.g., a delivery time or a manufacturing stage, but is not limited thereto), in advance, the slot card 73 reads the user country code stored on the media card a, and the slot machine 1 inputs the read user country code to the CPU 32 (the configuration may be such that another entry unit capable of entering the user country code (e.g., a manual entry unit with which the user country code is entered by person's manual operation) is provided to designate a user country code through the manual entry unit). The CPU 32 thus predetermines a user country from the inputted user country code. Based on the user country code that has provided a target for this determination, the image control circuit 71 performs changing of the display position of and setting or changing of the display layout of the game image, on a per user country basis. In the embodiment, a user country of user country code "01" is set to Australia and a user country of user country code "02" is set to the United States. However, the user countries are not limited to Australia and the United States but include even other countries such as South Africa, Japan, and China.

Figure 7A:
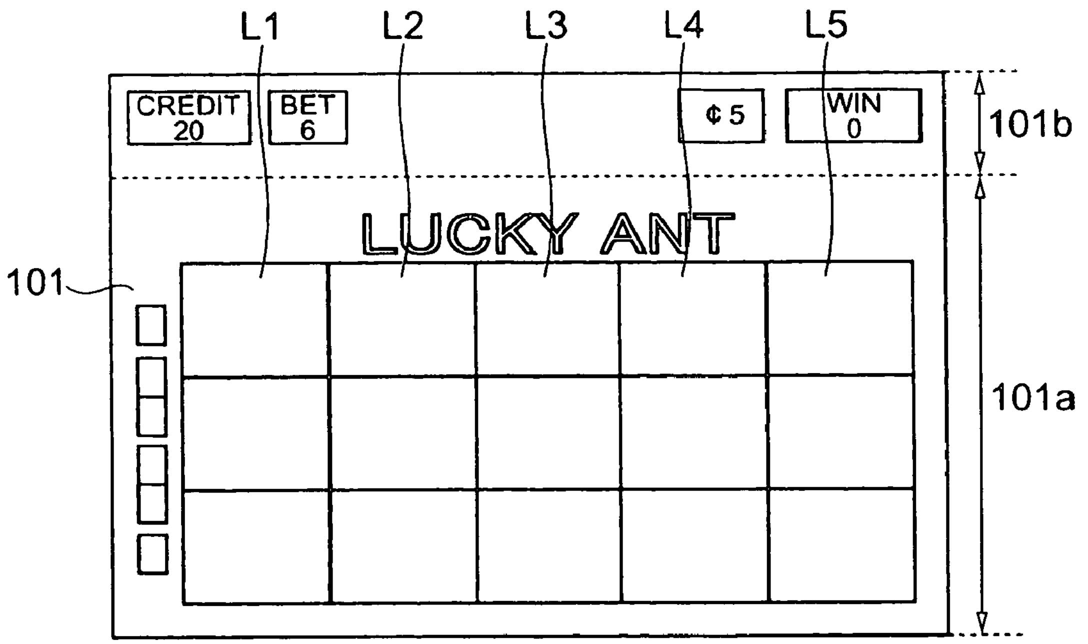
FIG. 7A is a diagram showing a game image of a user country in a normal game mode.
Figure 7B:
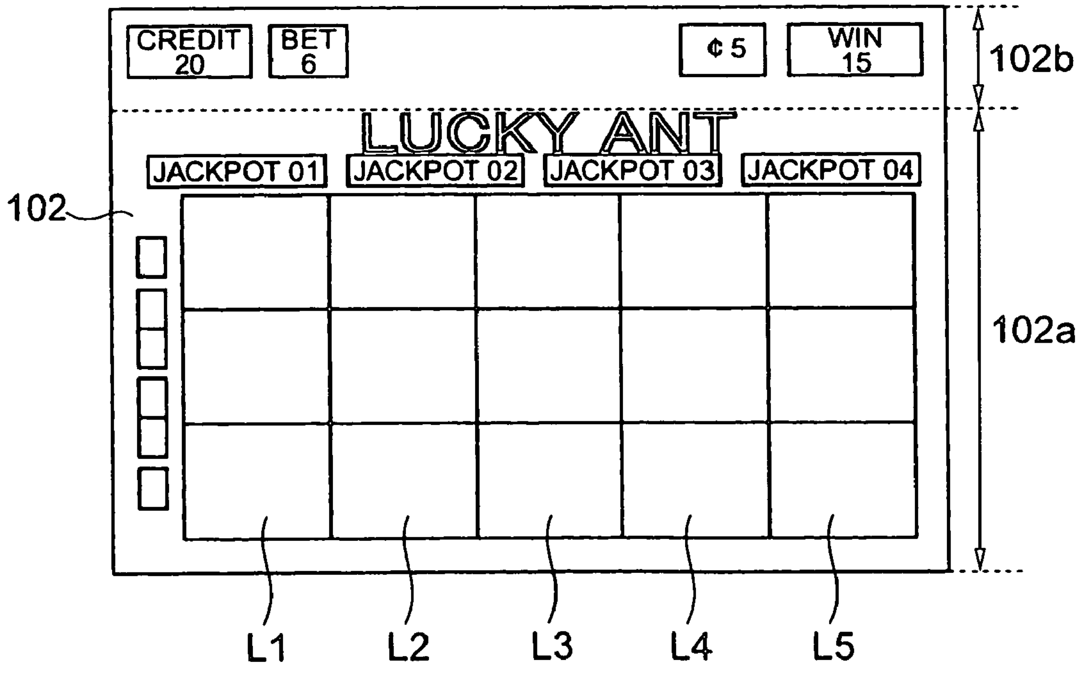
FIG. 7B is a diagram showing a game image of the same user country as that of FIG. 7A.

At step 3, the normal game process is performed with the game mode maintained in the normal game mode, so that the game image including the pseudo-reels is displayed. However, to display the game image, the image control CPU 71*a* performs setting of the display layout of the game image. For example, when the user country code is "01" and the CPU 32 determines that the user country is "Australia", the image control CPU 71*a* reads image data corresponding to the user country code "01" from the image ROM 71*d* and inputs the image data to the VDP 71*f*. In this case, the image data corresponding to the user country code "01" includes the common image data for use in displaying the game region 91*a* and the individual image data for use in displaying the country-specific region 91*b*, and the image control CPU 71*a* sets the display layout of the game image, using both the data. On this occasion, for example, such game images as shown in FIGS. 7A and 7B are displayed on the lower image display panel 4.

Besides, image data, the read user country code of which corresponds to "02", includes the common image data for use in displaying the game region 91*a* and the individual image data for use in displaying the country-specific region 91*c*. Therefore, when the user country code "02" is read subsequently to the user country code "01", the image control CPU 71*a* sets the display layout of the game image, using the image data corresponding to the user county code "02".

Figure 8A:
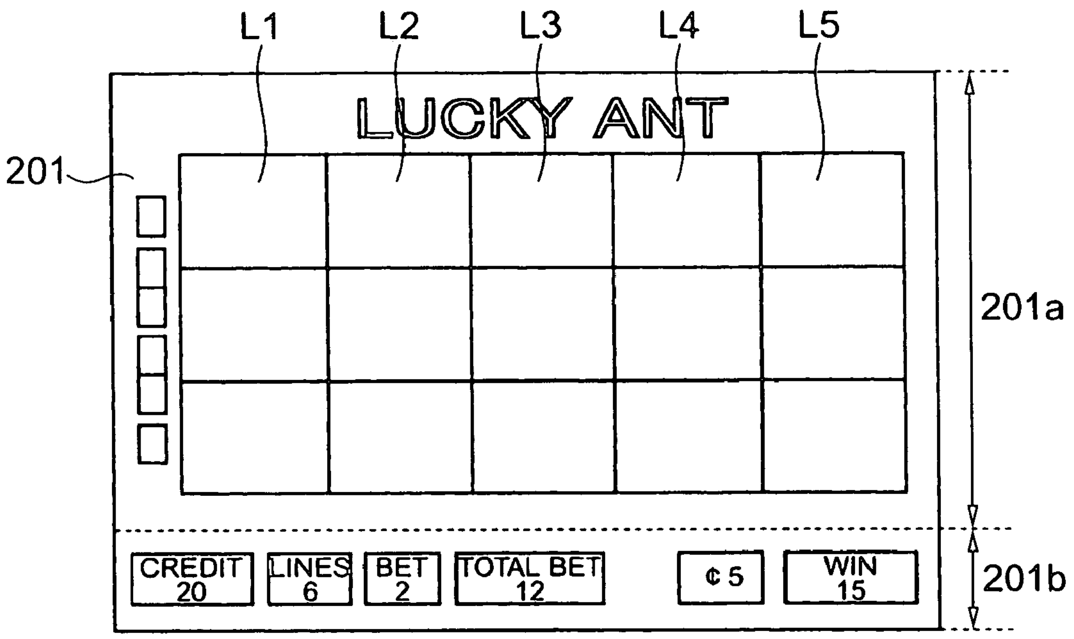
FIG. 8A is a diagram showing a game image of a different user country from those of FIGS. 7A and 7B.
Figure 8B:
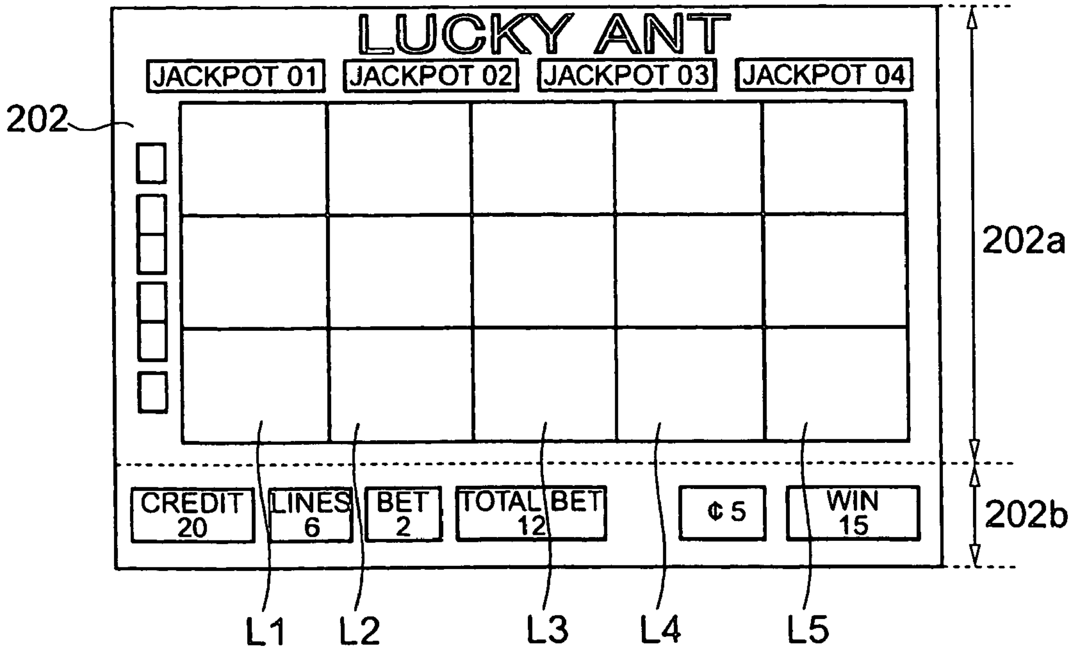
FIG. 8B is a diagram showing a game image of the same user country as that of FIG. 8A.

However, the configuration may be as follows. That is, any one user code (e.g., "01") is pre-set to the game image in an initial state and, when a read user country code is different (e.g., "02") from there-set one, the display layout of the game image is changed based on the read user country code. When the display layout of the game image is changed, for example, such game images as shown in FIGS. 8A and 8B are displayed on the lower image display panel 4.

Besides, the configuration may be such that the display position of the game image in the initial state corresponding to the user country code "01" is changed (in which the display position is shifted upward) based on the read user country code "02".

That is, the configuration may be such that the display layout of the game image is set each time the user country code is read, or that, with the game image in the initial state being pre-set, the display layout or display position of the game image is changed each time the user country code is read.

FIGS. 7A and 7B show game images 101 and 102, respectively. These game images, each showing the game image displayed when the user country is Australia, have: common regions 101*a* and 102*a* that, although differing slightly in their display content, are displayed using the common image data out of the general game image; and country-specific regions 101*b* and 102*b* displayed using the individual image data. A title display "LUCKY ANT" and pseudo-reels L1 to L5 are displayed in each of the common regions 101*a* and 102*a*. Meter images such as the number of CREDITs and the number of BETs are displayed in each of the country-specific regions 101*b* and 102*b*. When the user country code is "01", the slot machine 1 displays the game image 101 but may be configured to display the game image 102.

Besides, FIGS. 8A and 8B show two game images 201 and 202. These game images, each showing the game image displayed when the user country is the United States, have: common regions 201*a* and 202*a* that, although differing slightly in their display content, are displayed using the common image data out of the general game image; and country-specific regions 201*b* and 202*b* displayed using the individual image data. A title display "LUCKY ANT" and pseudo-reels L1 to L5 are displayed in each of the common regions 201*a* and 202*a*. Meter images such as the number of CREDITs and the number of BETs are displayed in each of the country-specific regions 201*b* and 202*b*. When the user country code is "02", the slot machine 1 displays the game image 201 but may be configured to display the game image 202.

And, as is apparent by comparison of the game image 101 (102) for Australia and the game image 201 (202) for the United States, both the game images, although differing in their display position on the lower image display panel 4, have the common regions 101*a* (102*a*) and 201*a* (202*a*) with the same display content. Besides, in the game image 101 (102), the country-specific region 101*b* (102*b*) is displayed above the common region 101*a* (102*a*), whereas, in the game image 201 (202), the country-specific region 201*b* (202*b*) is displayed below the common region 201*a* (202*a*). And, these game images also differ in their individual meter kinds. That is, when viewed as a whole, the game image 101 (102) for Australia and the game image 201 (202) for the United States, having apparently different contents, are displayed in conformity to the specifications of the respective countries.

Thus, the slot machine 1 performs changing of the display position of and changing or setting of the display layout of the game images, using the general game image data, so that the game images become suitable for use in Australia and the United States. Therefore, the general game image data need only be stored in the image ROM 71*d*, and there is no need to provide an individualized response such that the image data for Australia and the United States are individually generated and separately stored. Accordingly, the slot machine 1 is configured capable of reducing the development cost and period required to store the image data into the image ROM 71*d*.

Figure 9:
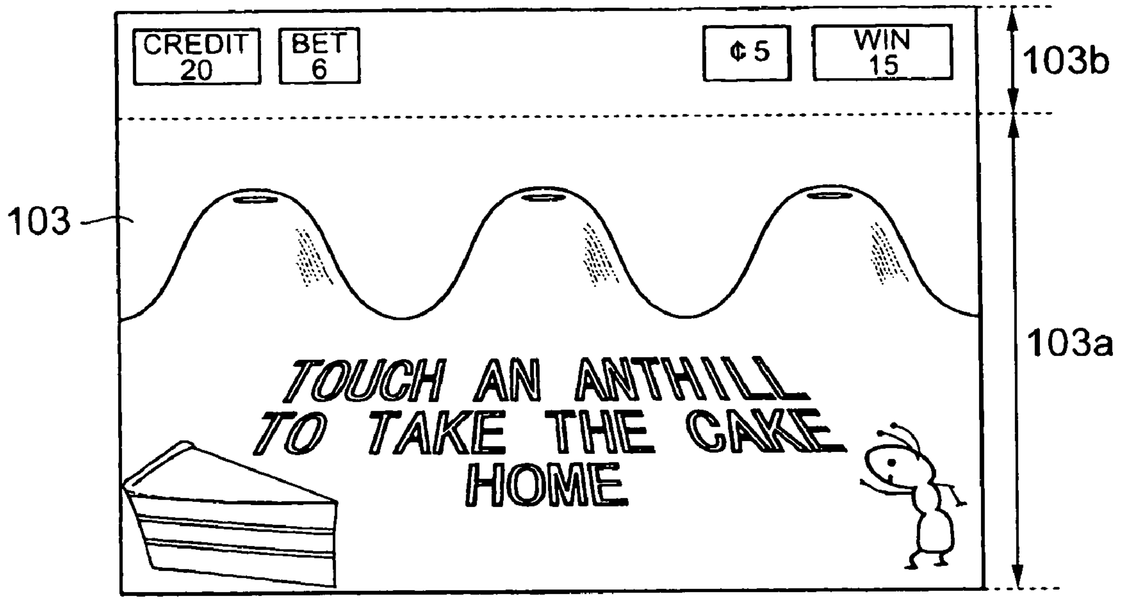
FIG. 9 is a diagram showing a game image of a user country in a special game mode.
Figure 10:
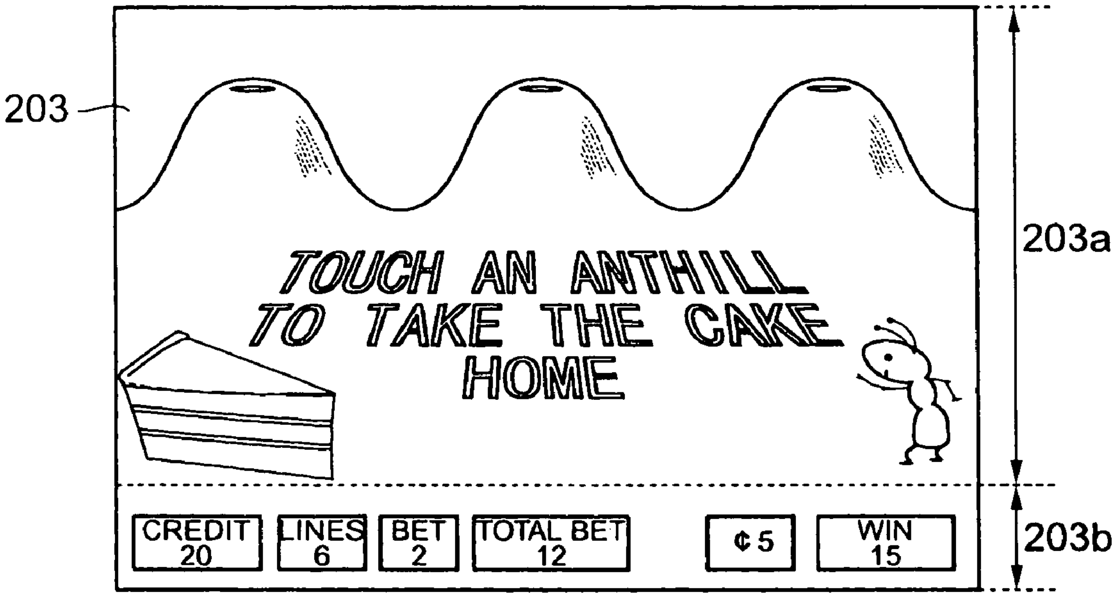
FIG. 10 is a diagram showing a game image, in the special game mode, of a different user country from that of FIG. 9.

Besides, in this respect, the same applies even to the case where the game mode is changed to the special game mode. That is, such a game image 103 as shown in FIG. 9 is displayed when the user country code is "01", whereas such a game image 203 as shown in FIG. 10 is displayed when the user country code is "02". The game images 103 and 203, although differing in their display position on the lower image display panel 4, have common regions 103*a* and 203*a* with the same display content. Besides, in the game image 103, a country-specific region 203*b* is displayed above the common region 203*a*, whereas, in the game image 203, a country-specific region 203*b* is displayed below the common region 203*a*. And, these game images also differ in their individual meter kinds. That is, even in the game images 103 and 203 displayed in the special game mode, when viewed as a whole, the game image 103 for Australia and the game image 203 for the United States, having apparently different contents, are displayed in conformity to the specifications of the respective countries.

In the special game mode as well, the slot machine 1 is configured capable of reducing the development cost and period required to store the image data into the image ROM 71*d*.

In the aforesaid slot machine 1, changing of the display position, setting of the display layout, etc. of the game image are performed based on the user country code. Alternatively, such changing, setting, etc. may be performed based on the game mode. For example, the configuration may be as follows. That is, to generate the aforesaid general game image data, such data is pre-generated including even the image data for use in the special game mode. Thus, in the normal game mode, the game image is displayed as shown in FIGS. 7A and 7B, whereas, when the game mode turns to the special game mode, the display position is changed to display the game image as shown in FIG. 10.

Besides, when changed, the display position is shifted in an up-and-down direction but may be shifted in a side-to-side direction.

One Embodiment of the Invention

The following slot machine 51 will now be described as one embodiment of the invention. Additionally, the slot machine 51 has a common configuration with the aforesaid slot machine 1, and some operational contents are common to both the slot machines. Therefore, the following description is focused on their differences, and their similarities are omitted from the description or the description thereof is simplified.

Figure 11:
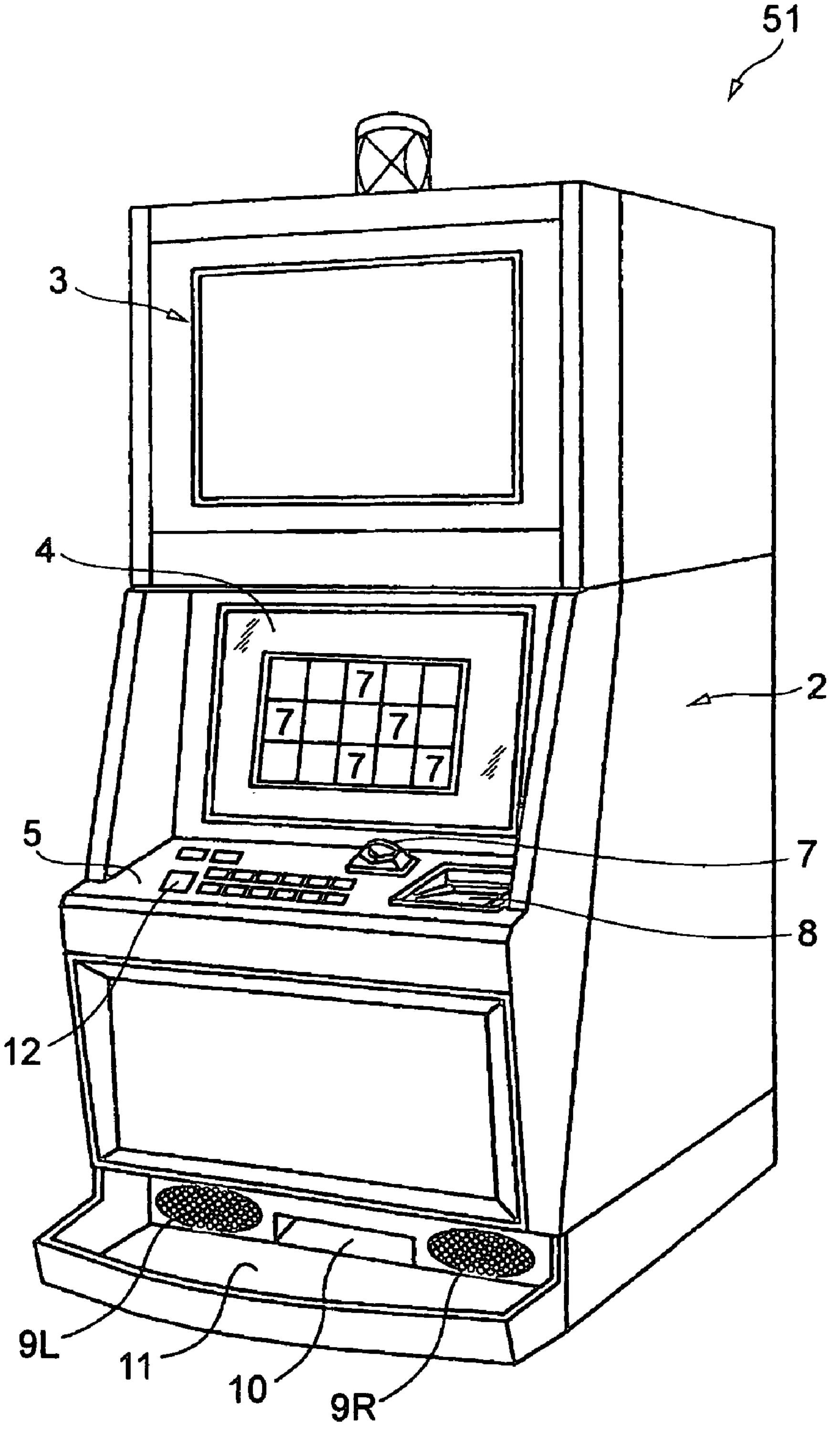
FIG. 11 is a perspective view showing the overall configuration of a slot machine that is a gaming machine according to an embodiment of the invention.
Figure 12:
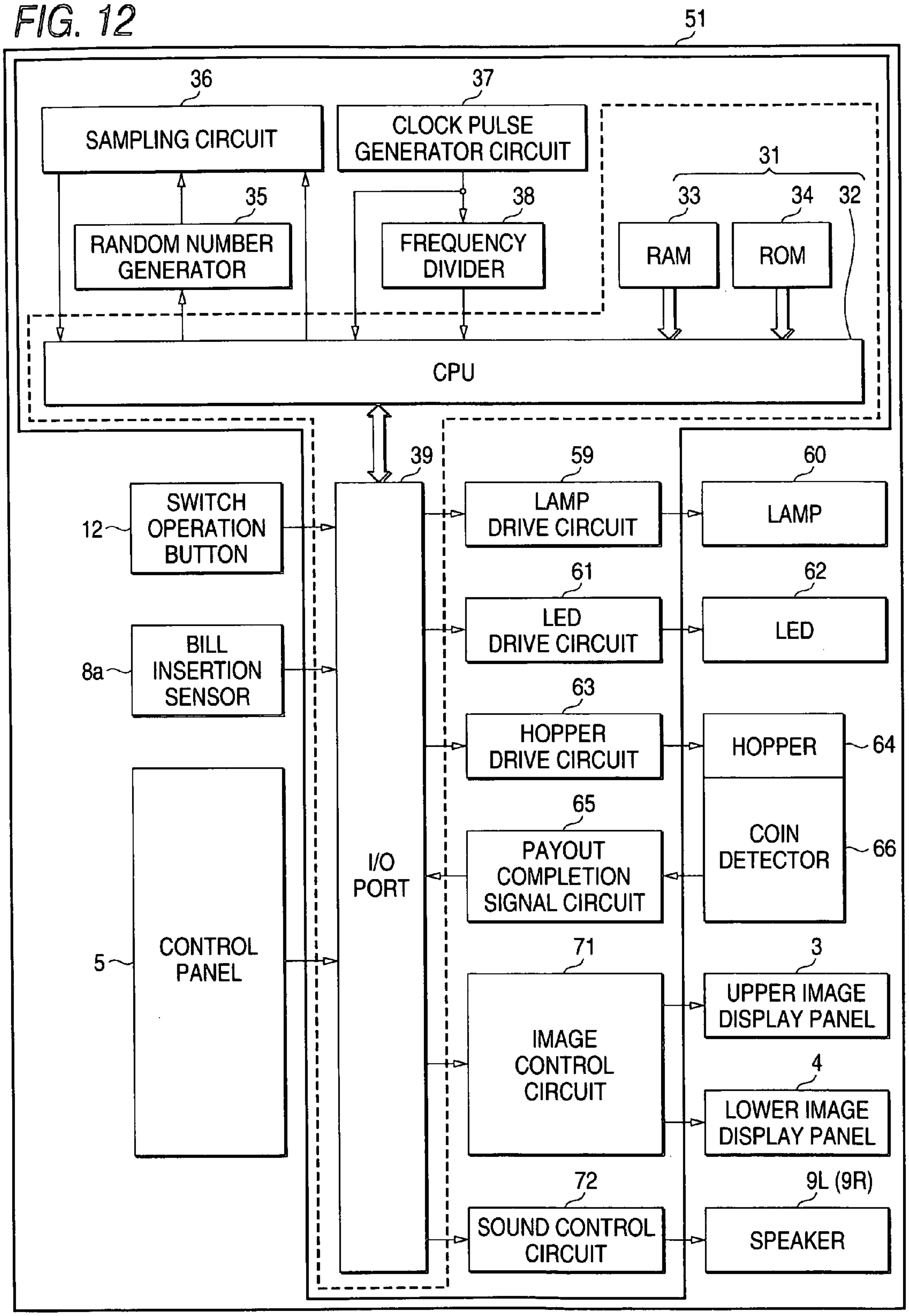
FIG. 12 is a block diagram of the slot machine shown in FIG. 11, mainly showing the internal configuration thereof.

FIG. 11 is a perspective view showing the overall configuration of the slot machine 51, and FIG. 12 is a block diagram mainly showing the internal configuration of the slot machine 51. The slot machine 51 is different from the slot machine 1 in that it has a switch operation button 12, that it does not include the card slot 73, and that a microcomputer 31 and an image control circuit 71 are different in operation. The other configurations are common to those of the slot machine 1.

That is, similar to the slot machine 1, the slot machine 51, having a cabinet 2, includes on the front side of the cabinet 2, from the top down, an upper image display panel 3 and a lower image display panel 4. The upper image display panel 3 displays an image such as not being directly involved in the game. The lower image display panel 4, disposed substantially in the vertical center of the cabinet 2, is configured of a not-shown liquid crystal display device. This lower image display panel 4, which is the display unit of the invention, is configured to display a game image including reel images.

Furthermore, a control panel 5 similar to that of the slot machine 1 is disposed below the lower image display panel 4. And, provided at the bottom of the cabinet 2 are a coin payout opening 10, a coin receiving tray 11, and speakers 9L and 9R.

Besides, the slot machine 51 has the switch operation button 12 disposed on the left side of the control panel 5 (additionally, similar to the slot machine 1, the control panel 5 has a coin insertion slot 7 and a bill insertion slot 8).

The switch operation button 12, which is the operation unit of the invention, has a plurality of buttons that are not shown. By individual or combinational button depression operations, the switch operation button 12 outputs plural kinds of to-be-described identification codes (in this embodiment, six kinds of identification codes a, b, c, d, e, and f) serving as the identification information of the invention.

And, similar to the slot machine 1, the slot machine 51 has a plurality of components (a random number generator 35, a sampling circuit 36, a clock pulse generator circuit 37, and a frequency divider 38, which are similar to those of the slot machine 1) around the microcomputer 31. Besides, the slot machine 1 has a lamp drive circuit 59, an LED drive circuit 61, a hopper drive circuit 63, a payout completion signal circuit 65, the image control circuit 71, and a sound control circuit 72. Out of these components, the image control circuit 71 is different from that of the slot machine 1, and the others are common to those of the slot machine 1.

Similar to the slot machine 1, the microcomputer 31 has a CPU 32, a RAM 33, and a ROM 34. Similar to the slot machine 1, the CPU 32 operates in accordance with programs stored in the ROM 34 to perform operational control of the entire slot machine 51. In contrast, unlike the slot machine 1, the CPU 32 operates as the specification unit of the invention to specify to-be-described corresponding individual image data. Similar to the slot machine 1, the ROM 34 stores programs to be executed by the CPU 32 and permanent data. In contrast, the ROM 34 is different from that of the slot machine 1 in that it has the function of serving as the specification information storage unit and stores a specification table 110 shown in FIG. 14B. This specification table 110, having an identification code area 110*a* and an individual image area 110*b*, stores individual data codes for specifying individual image data as being correlated with the identification codes. Thus, the configuration is such as to be capable of specifying at least one corresponding individual image data which corresponds to an identification code. According to this specification table 110, for example, the corresponding individual image data which corresponds to the identification code a is to-be-described individual image data 112*a*. Similar to the slot machine 1, data and programs for use in operation of the CPU 32 are stored in the ROM 34.

The image control circuit 71 controls image display on each of the upper and lower image display panels 3 and 4.

Similar to the slot machine 1, the image control circuit 71 has an image control CPU 71*a*, a work RAM 71*b*, a program ROM 71*c*, an image ROM 71*d*, a video RAM 71*e*, and a VDP (Video Display Processor) 71*f*. Based on a parameter set by the microcomputer 31, the image control CPU 71*a*, in accordance with an image control program pre-stored in the program ROM 71*c*, determines an image to be displayed on the upper image display panel 3. Besides, based on a parameter set by the microcomputer 31, the image control CPU 71*a* determines an image to be displayed on the lower image display panel 4. Furthermore, the image control CPU 71*a* has the function of serving as the determination unit of the invention which determines a positional relationship between a to-be-described common image 211 and a corresponding individual image (e.g., a to-be-described corresponding individual image 212*a*) on the lower image display panel 4. The work RAM 71*b*, video RAM 71*e*, and VDP 71*f* are common to those of the slot machine 1.

Figures 14A, 14B:
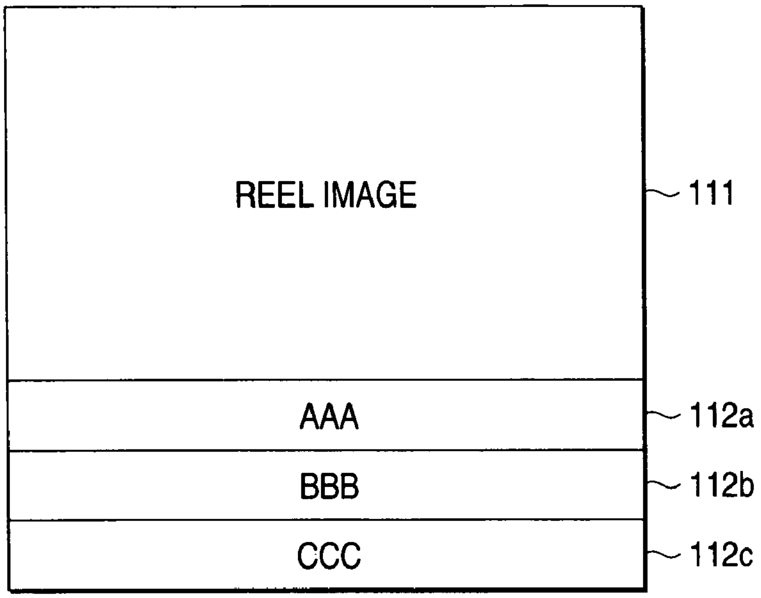

The program ROM 71*c* stores an image control program, which includes programs for allowing the image control CPU 71*a* to function as the determination unit and the display control unit, various selection tables, etc. The image ROM 71*d*, which is the image data storage unit of the invention, stores dot data for forming an image. In the case of the slot machine 51, as shown in FIG. 14A, this dot data includes common image data (image data for displaying reel images including pseudo-reels) 111 and a plurality of individual image data 112*a*, 112*b*, and 112*c*.

The common image data 111 is image data for displaying an image common to operation environments of the slot machine 51, i.e., a common image 211 whose content is unchanged even with a change in operation environment. The operation environments are various elements that influence the operation of the slot machine 51. In the case of the slot machine 51, for example, as a spatial environment, there is an installation site in which to install the slot machine 51, such as a country, a state, a province, and a district. And, as a temporal environment, there are an installation time and an operation start time in which to install the slot machine 51, such as a month, a season, and a year. Accordingly, the common image data 111 can act as image data for displaying a common image common to the installation sites (i.e., an image whose content is unchanged even with a change in installation site) and an common image common to the installation times (i.e., an image whose content is unchanged even with a change in installation time). Additionally, the configuration may be such that the image ROM 71*d* is allowed to store general game image data as in the slot machine 1 and such that the general game image data includes the common image data 111 and the plurality of individual image data 112*a*, 112*b*, and 112*c*.

The individual image data 112*a*, 112*b*, and 112*c* are image data each for displaying an image that is individually used for each operation environment (i.e., an image whose content differs for different operation environments). The individual image data 112*a*, 112*b*, and 112*c* each can be used as, for example, image data for displaying an image that is individually used for each installation site and time (i.e., an image whose content differs for different installation sites and times).

Figure 15A:
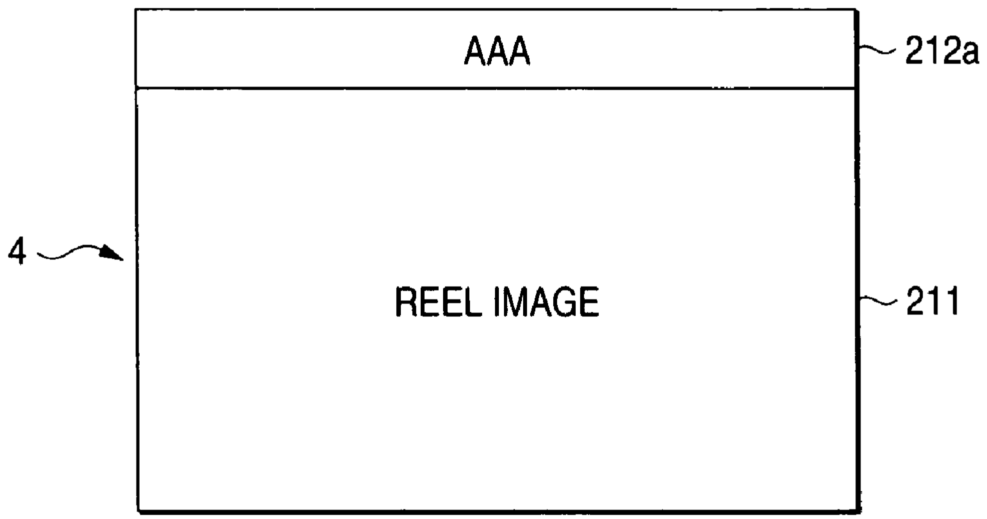
Figure 15B:
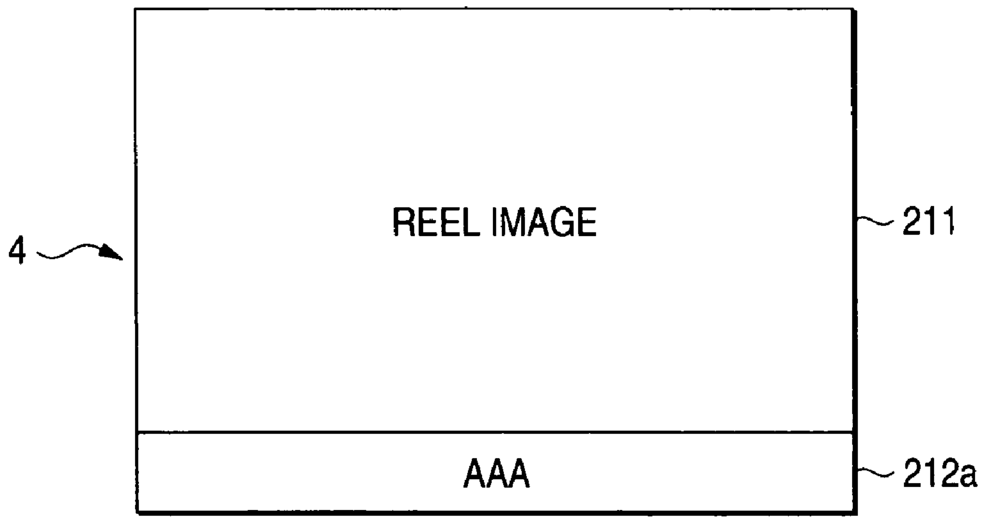

And, to display the game image on the lower image display panel 4, using such common image data 111 and individual image data 112*a*, 112*b*, and 112*c*, the image control circuit 71 (image control CPU 71*a*) determines the following positional relationship on the lower image display panel 4. That is, the positional relationship is between the common image 211 based on the common image data 111 and a corresponding individual image (e.g., the corresponding individual image 212*a*) based on corresponding individual image data specified by the CPU 32 out of the individual image data 112*a*, 112*b*, and 112*c*. Thus, the game image is displayed in accordance with the determined positional relationship. In this case, for example, the game image is displayed on the lower image display panel 4 as shown in FIG. 15A on the one hand and as shown in FIG. 15B on the other hand (which will be described later in detail). In FIGS. 14A and 15A to 18, "AAA", "BBB", and "CCC" are displayed for convenience of description, but these letter strings "AAA", "BBB", and "CCC" are not displayed on the lower image display panel 4. The display of "AAA", "BBB", and "CCC" means that images having different contents from each other are displayed.

(Operational Contents of Slot Machine)

The operational contents of the slot machine 51 having the above configuration will now be described. Similar to the slot machine 1, along the flowchart shown in FIG. 5, the slot machine 1 performs a game in the normal game mode and in the special game mode for use under conditions where the transition condition is fulfilled. Besides, the slot machine 51 operates in a game mode where the game is played and, in addition thereto, operates even in a mode (maintenance mode) corresponding to a manufacturing stage or a maintenance operation. In this maintenance mode, an entry made using the switch operation button 12 is validated by control of the CPU 32 (in the game mode, an entry made using the switch operation button 12 is validated in the start reception process).

And, on the slot machine 51, in the maintenance mode and the start reception process, the CPU 32 operates as the specification unit of the invention, whereas the image control circuit 71 (image control CPU 71*a*) operates as the determination unit and a display control unit of the invention, thus displaying the game image on the lower image display panel 4.

In the maintenance mode and the start reception process, when, for example, a slot machine 51 manufacturing operator, examiner, or player performs a depression operation of the switch operation button 12, an identification code responsive to the depressed button is outputted from the switch operation button 12 and inputted to the CPU 32. This identification code is data for specifying any one of a potential plurality of operation environments (e.g., the installation site, installation time, and operation start time) of the slot machine 51 (in this embodiment, six identification codes a, b, c, d, and f are prepared in response to the assumed number of operation environments).

Upon input of an identification code, the CPU 32 operates as the specification unit of the invention and sets the inputted identification code in a search key to search the specification table 110, thus specifying corresponding individual image data which corresponds to the identification code. On this occasion, for example, upon input of the identification code a, the CPU 32 specifies the individual image data 112*a* as the corresponding individual image data 112*a*. In contrast, upon input of the identification code c, the CPU 32 specifies the individual image data 112*a* and 112*b* as the corresponding individual image data 112*a* and 112*b*. Then, the CPU 32 inputs to the image control circuit 71 a directive command including the inputted identification codes and the corresponding individual image data.

In the image control circuit 71, upon input of a directive command, based on the identification code included in the directive command, the image control CPU 71*a* operates as the determination unit to determine the positional relationship between the common image 211 based on the common image data 111 and a corresponding individual image (e.g., the corresponding individual image 212*a*) based on the corresponding individual image data. For example, upon input of the identification code a, the image control CPU 71*a* determines the positional relationship therebetween such that "the corresponding individual image 212*a* is disposed on the upper side of the common image 211." Besides, upon input of the identification code b, the image control CPU 71*a* determines the positional relationship therebetween such that "the corresponding individual image 212*a* is disposed on the lower side of the common image 211."

Subsequently, the image control CPU 71*a* operates as the display control unit to display the common image and the corresponding individual image on the lower image display panel 4 in accordance with the determined positional relationship. In this case, for example, when the directive command includes the identification code a and the identification code b, their corresponding individual image data are each the individual image data 112*a*. However, with the identification code a, displayed as shown in FIG. 15A is the game image in which the individual image 212*a* is disposed on the upper side of the common image 211. In contrast, with the identification code b, displayed as shown in FIG. 15B is the game image in which the individual image 212*a* is disposed on the lower side of the common image 211.

Figure 16A:
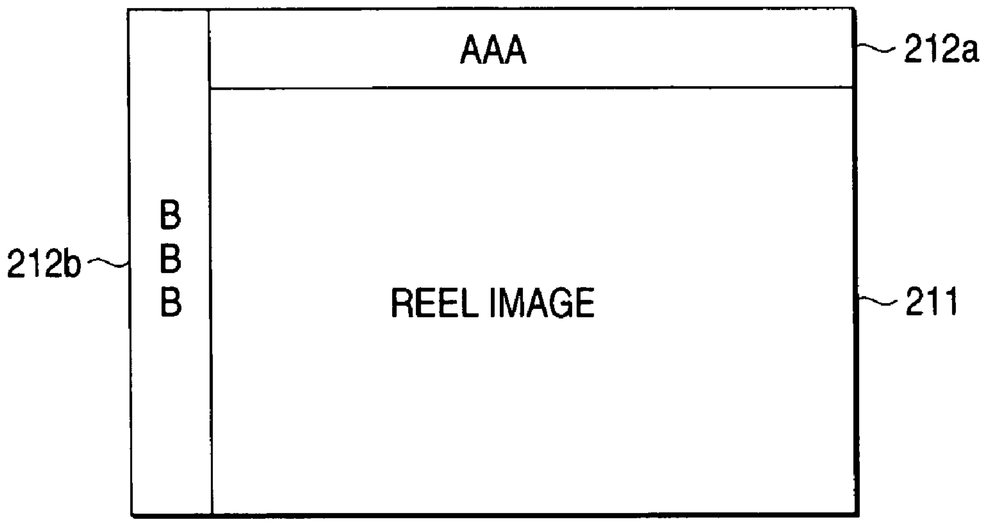
Figure 16B:
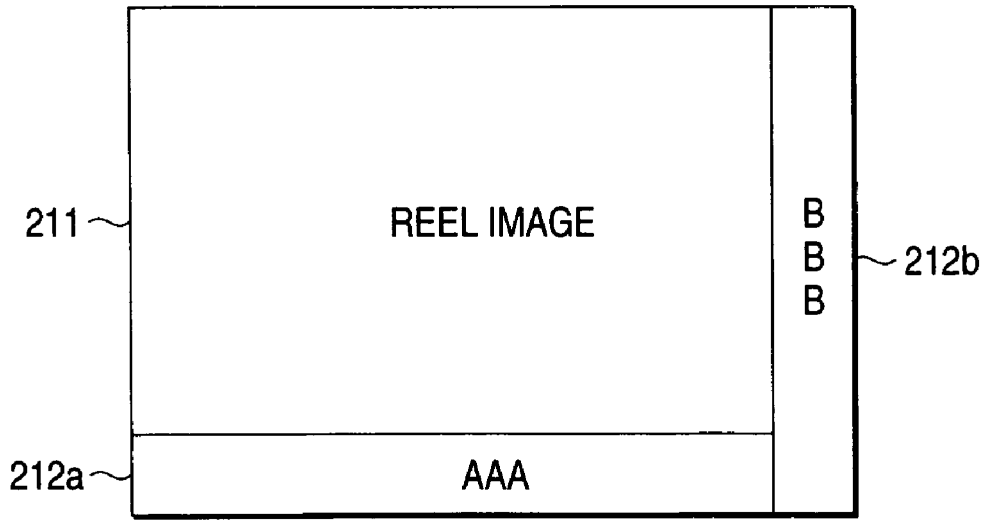

Besides, in the cases of the identification codes c and d, two kinds of individual image data 112*a* and 112*b* act as their corresponding individual image data. In these cases, the game images are displayed, such as shown in FIGS. 16A and 16B, respectively. With the identification codes c and d, the positional relationships are determined such that "the corresponding individual image 212*a* is disposed on the upper side of the common image 211 and the corresponding individual image 212*b* is disposed on the left side thereof" and "the corresponding individual image 212*a* is disposed on the lower side of the common image 211 and the corresponding individual image 212*b* is disposed on the right side thereof," respectively. The game images are displayed on the lower image displayed panel 4 in accordance with these determined positional relationships.

Figure 17A:
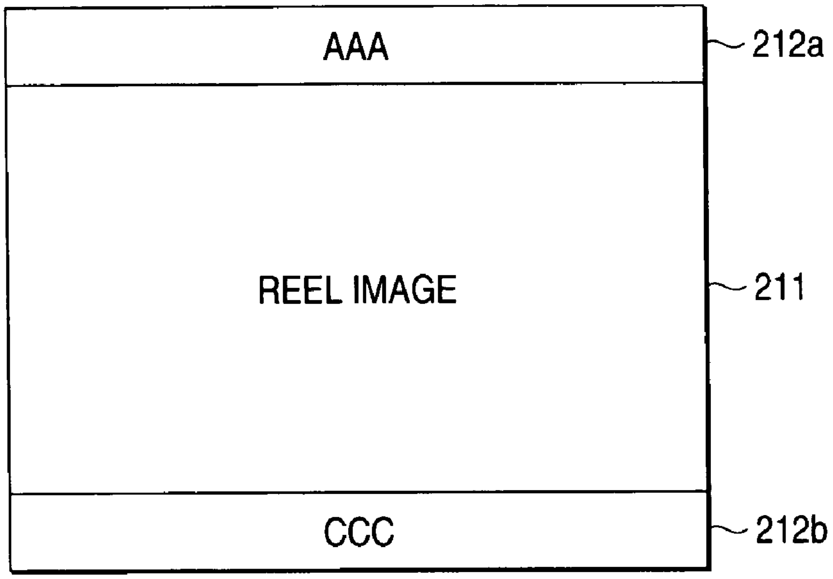
Figure 17B:
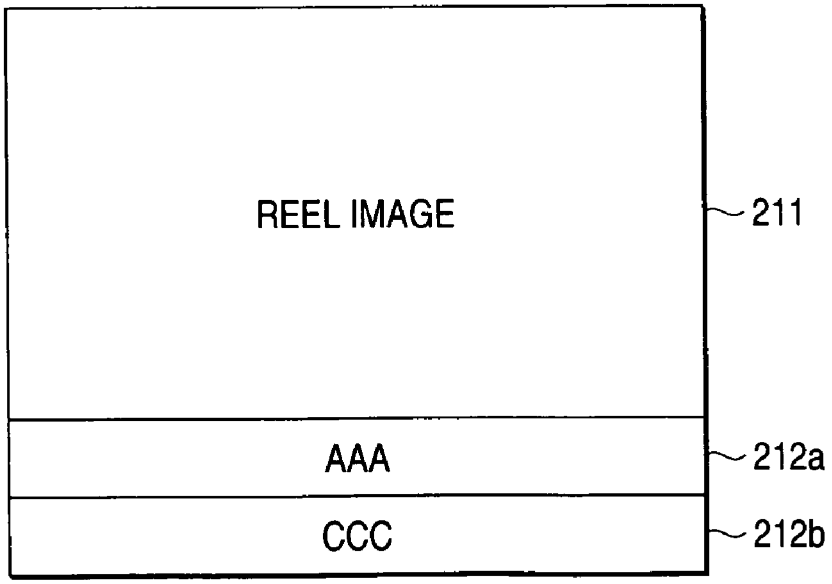

Furthermore, in the cases of the identification codes e and f, the individual image data 112*a* and 112*c* act as their corresponding individual image data. In these cases, the game images are displayed, such as shown in FIGS. 17A and 17B, respectively. With the identification codes e and f, the positional relationships are determined such that "the corresponding individual images 212*a* and 212*c* are disposed on the upper and lower sides of the common image 211" and "the corresponding individual images 212*a* and 212*c* are sequentially disposed on the lower side of the common image 211," respectively. The game images are displayed on the lower image displayed panel 4 in accordance with these determined positional relationships.

Thus, the slot machine 51 has two kinds of installation sites, for example, Kanto District and Kansai District. When the game image is intended to change in response to each of the installation sites, the switch operation button 12 is operated so as to input an identification code corresponding to each installation site. Thereby, different game images can be displayed on the lower image display panel 4. In this case, for example, FIG. 15A is used for Kanto District and FIG. 15B is used for Kansai District. Besides, when the game image is intended to differ for each of four kinds of districts with Hokkaido and Kyushu Districts added to two districts of Kanto and Kansai, it is only necessary that FIG. 16A is used for Hokkaido District and FIG. 16B is used for Kyushu District. Similarly, when the game image is intended to change in response to the time of year change and the season (e.g., to switch the year between 2004 and 2005), it is only necessary that FIG. 15A is used for 2004 and FIG. 15B is used for 2005.

Accordingly, similar to the slot machine 1, in the slot machine 51, even when the game image is changed for each operation environment (e.g., the installation site, installation time, and operation start time), there is no need to provide an individualized response such that individual image data responsive to respective operation environments are generated and stored. Consequently, the slot machine 51 is configured capable of reducing the development cost and period required to store the image data into the image ROM 71*d*.

Besides, in the case of the slot machine 51, the identification code entry made by operating the switch operation button 12 can be performed not only in the maintenance mode but also in the start reception process in the game mode. Consequently, in the slot machine 51, the display of the game image switches when the player operates the switch operation button 12 in the start reception process. Therefore, the slot machine 51 is configured capable of meeting a demand such that the player intends to change the display of the game image in response to his/her own taste.

MODIFIED EXAMPLE 1

Figure 13:
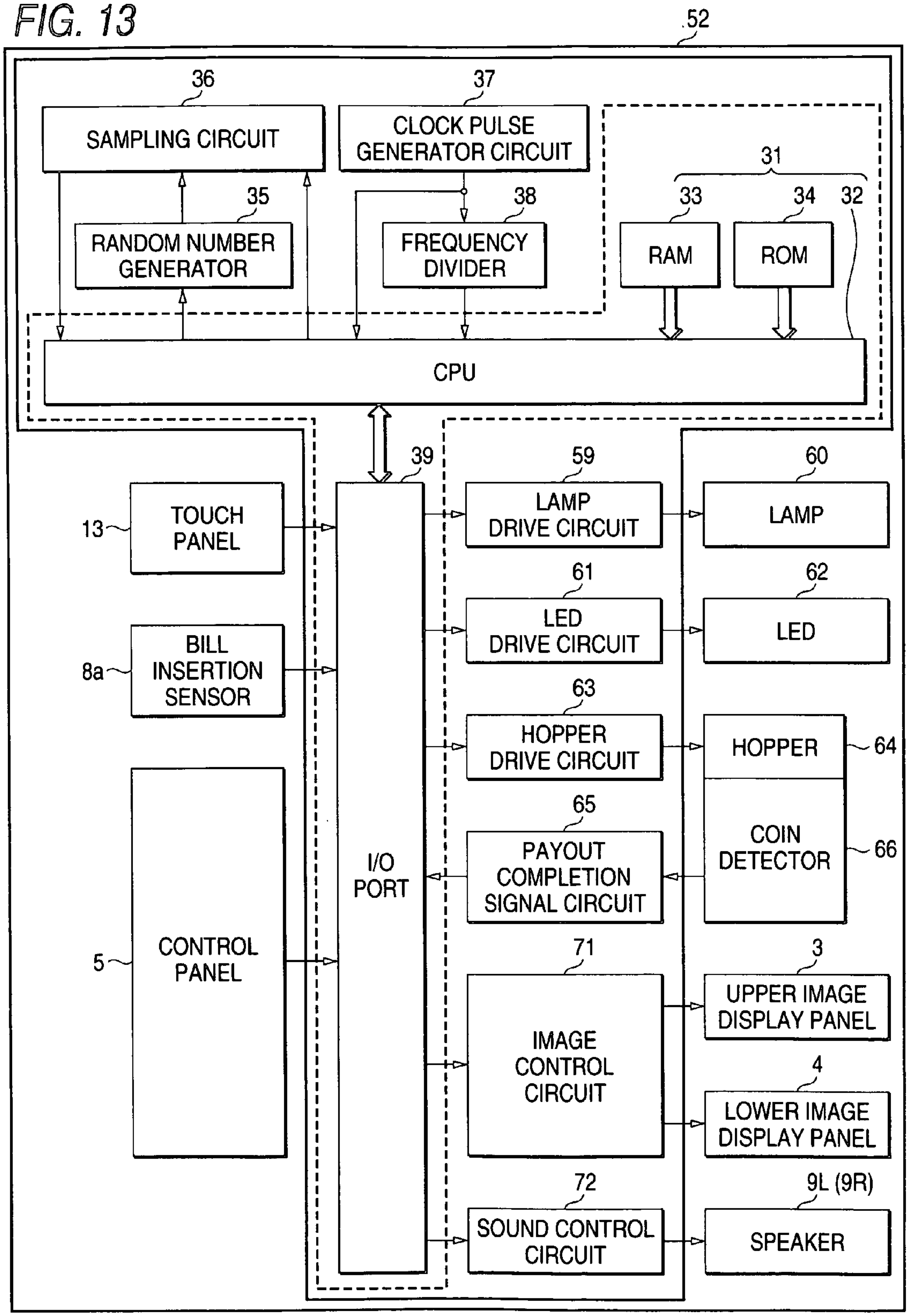
FIG. 13 is a block diagram of another slot machine, mainly showing the internal configuration thereof.

FIG. 13 is a block diagram mainly showing the internal configuration of a slot machine 52. The slot machine 52 is different from the slot machine 51 in that it has a touch panel 13 as the operation unit, instead of the switch operation button 12. This touch panel 13 is disposed covering a surface of not-shown protective glass on the front side of a lower image display panel 4. This touch panel 13 detects a position (contact position) touched by a finger of the player or any other contact body, and inputs to a CPU 32 an identification code serving as corresponding input information which corresponds to the contact position.

Besides, in the slot machine 52, a ROM 34 stores a display pattern table 115 shown in FIG. 18 and has the function of serving as the display mode storage unit of the invention. The display pattern table 115, having an identification code area 115*a* and a display pattern area 115*b*, stores display pattern codes for specifying a plurality of display patterns as being correlated with the identification codes. Thus, the configuration is such as to be capable of specifying a display pattern in response to an identification code.

Here, the display pattern, which is the display mode of the invention, is data capable of specifying the manner of displaying on the lower display panel 4 at least any one of individual images 212*a* to 212*c* (mainly, the positional relationship between a common image 211 and each of the individual images 212*a* to 212*c*). As aforesaid, in the slot machine 51, the image control CPU 71*a* determines the positional relationship between the common image 211 and a corresponding individual image which corresponds to an identification code out of the individual images 212*a* to 212*c*. In contrast, in the slot machine 52, data capable of specifying a positional relationship to be determined by an image control CPU 71*a* is stored, as the display pattern, in the display pattern table 115. For example, a display pattern corresponding to the identification code a act as data capable of specifying "the individual image 212*a* is disposed on the upper side of the common image."

And, in the slot machine 52, an identification code is inputted to the CPU 32 as an entry is made by operating the touch panel 13. Then, the CPU 32 operates as the mode specification unit of the invention and sets the inputted identification code in a search key to search the display pattern table 115, thus specifying a display pattern corresponding to the identification code as a corresponding display pattern (the corresponding display mode of the invention). Besides, the CPU 32 inputs to an image control circuit 71 a directive command including data indicative of the specified corresponding display pattern.

In the image control circuit 71, upon input of a directive command, the image control CPU 71*a* operates as the display control unit to dispose the common image and a corresponding individual image in accordance with a corresponding display pattern included in the directive command, thus displaying a game image. In this case as well, similar to the slot machine 51, plural kinds of game images are displayed, such as shown in FIGS. 15A, 15B, 16A, 16B, 17A, and 17B.

Similar to the slot machine 51, in the slot machine 52 as well, plural kinds of game images are thus displayed, so that, even to display the plural kinds of game images, there is no need to provide an individualized response to each game image. Thus, the slot machine 52 is configured capable of reducing the development cost and period required to store image data into an image ROM 71*d*.

MODIFIED EXAMPLE 2

Figure 19A:
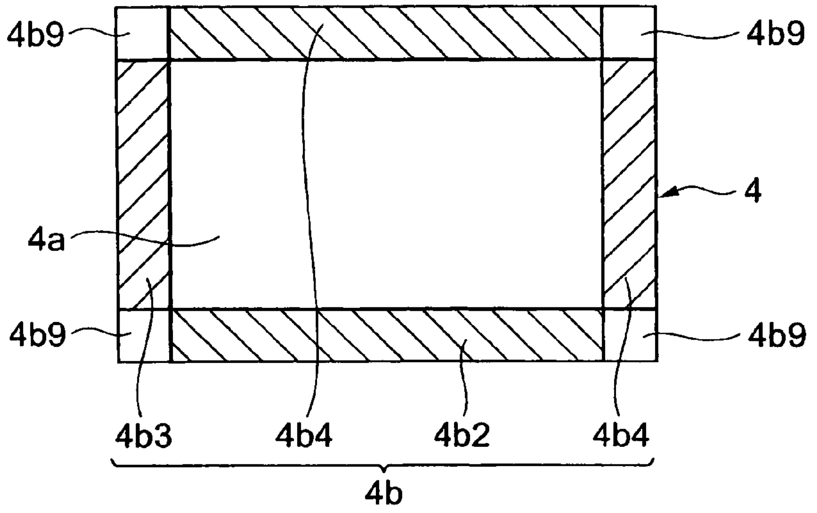
Figure 19B:
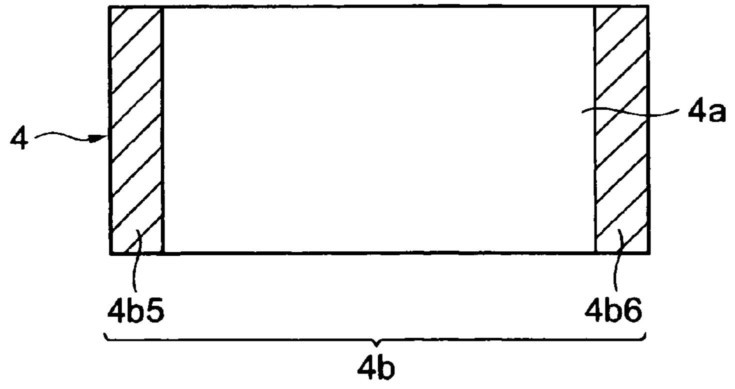
Figure 19C:
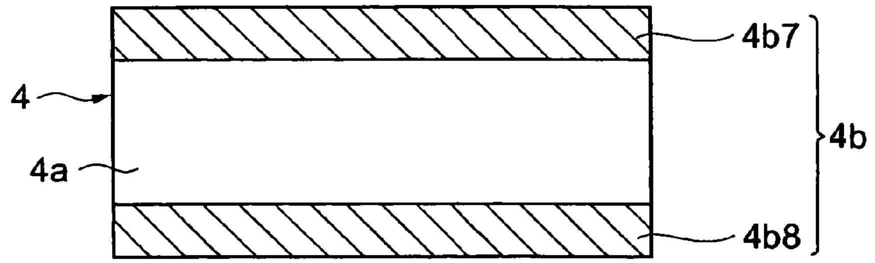

A modified example of the slot machine 51 will now be described. This slot machine 51 is configured such that, as shown in FIGS. 19A, 19B, and 19C, in a lower image display panel 4, a common image region 4*a* and a position adjustment region 4*b* are secured by means of an image control CPU 71*a* serving as the display control unit. In the case of FIG. 19A, the common image region 4*a*, disposed in the center of the lower image display panel 4, is a region capable of displaying a common image. The position adjustment region 4*b* (shaded in FIGS. 19A to 19C), having first to fourth position adjustment regions 4*b*1, 4*b*2, 4*b*3, and 4*b*4 that are disposed adjacent to the periphery of the common image region 4*a*, is a region (at four corners of which spare regions 4*b*9 are secured) for use in adjusting the display position of the common image. In the case of FIG. 19B, two position adjustment regions 4*b*5 and 4*b*6 are disposed on both the left and right sides of the lower image display panel 4, and the common image region 4*a* is disposed inside of the position adjustment regions 4*b*5 and 4*b*6. In the case of FIG. 19C, two position adjustment regions 4*b*7 and 4*b*8 are disposed on both upper and lower sides of the lower image display panel 4, and the common image region 4*a* is disposed inside of the position adjustment regions 4*b*7 and 4*b*8. Additionally, the position adjustment regions are each used as a region in which to display an individual image.

And, a ROM 34, storing a position specification table 120, has the function of serving as the position code storage unit. This position specification table 120, having an identification code area 120*a* and a corresponding region area 120*b* as shown in FIG. 20, stores position codes for specifying position adjustment regions as being correlated with identification codes. Thus, the configuration is such as to be capable of specifying at least one position adjustment region corresponding to an identification code. Additionally, this shown specification table 120 corresponds to the lower image display panel 4 shown in FIG. 19A, and the following description corresponds to the lower image display panel 4 shown in FIG. 19A.

And, in the case of this slot machine 51, upon input of an identification code, a CPU 32 sets the inputted identification code in a search key to search the position specification table 120, thus specifying a corresponding region that corresponds to the identification code, out of a plurality of the position adjustment regions. On this occasion, for example, upon input of the identification code a, the CPU 32 specifies the position adjustment region 4*b*1 as the corresponding region. In contrast, upon input of the identification code c, the CPU 32 specifies the position adjustment regions 4*b*1 and 4*b*3 as the corresponding regions. Then, the CPU 32 inputs to an image control circuit 71 a directive command including the inputted identification codes and the corresponding regions.

In the image control circuit 71, upon input of a directive command, the image control CPU 71*a* operates as the display control unit to display at least any one of plural individual images in the corresponding region included in the directive command and to display the common image 211 in the other regions including the common region 4*a*. In this case, an individual image to be displayed in the corresponding region need only be determined, as aforesaid, by searching the specification table 120, but may be determined by another method. Besides, the spare regions 4*b*9 are appropriately used to display the individual image in the corresponding region.

Then, for example, upon input of the identification code a, the position adjustment region 4*b*1 is specified as the corresponding region. Therefore, an individual image is displayed using the position adjustment region 4*b*1 and the spare regions 4*b*9 disposed on both sides thereof. And, the common image 211 is displayed using the other regions (the common region 4*a*, the position adjustment regions 4*b*2, 4*b*3, and 4*b*4, and the spare regions 4*b*9 disposed on both sides of the position adjustment region 4*b*2). Thus, a game image is displayed as shown in FIG. 15A. Similarly, upon input of the identification code b, the position adjustment region 4*b*2 is specified as the corresponding region. Therefore, an individual image is displayed using the position adjustment region 4*b*2 and the spare regions 4*b*9 disposed on both sides thereof. And, the common image 211 is displayed using the other regions (the common region 4*a*, the position adjustment regions 4*b*l, 4*b*3, and 4*b*4, and the spare regions 4*b*9 disposed on both sides of the position adjustment region 4*b*1). Thus, a game image is displayed as shown in FIG. 15B. Furthermore, upon input of the identification code c, the position adjustment regions 4*b*1 and 4*b*3 are specified as the corresponding regions. Therefore, the position adjustment regions 4*b*1 and 4*b*3 and three spare regions 4*b*9, two of which are disposed on both sides of the position adjustment region 4*b*1 and the remaining one of which is disposed between the position adjustment regions 4*b*2 and 4*b*3, are used to display an individual image. And, the other regions (the common region 4*a*, the position adjustment regions 4*b*2 and 4*b*4 and the spare region 4*b*9 disposed therebetween) are used to display the common image 211. Thus, a game image is displayed as shown in FIG. 16A.

As the above, in the slot machine 51, plural kinds of game images are displayed. Therefore, even to display a plurality of game images, there is no need to provide an individualized response to each of the game images. Thus, the slot machine 51 is configured capable of reducing the development cost and period required to store image data into the image ROM 71*d*.

Additionally, in the aforesaid embodiment, the slot machine has been described as an example. However, the invention is also applicable to a slot machine or Pachi-Slot machine that has not-shown mechanical reels on the back side of the liquid crystal display device.

Furthermore, the slot machine 1 uses the liquid crystal display device as the upper, lower image display panels 3, 4 but may use a transparent EL panel instead of the liquid crystal display device.

Besides, the slot machine 1 may be structured such that another liquid crystal display device is disposed on the front side of the aforesaid liquid crystal display device so as to sandwich a transparent acryl plate therebetween and such that the two liquid crystal display devices are arranged multiplexed along such a direction as to be rendered visible to the player (multiplex arrangement structure). This multiplex arrangement structure makes it possible that an image with a perspective and stereoscopic effect rendered to a sufficient degree is displayed on the lower image display panel 4.

Additionally, the slot machine 1 has five pseudo-reels arrayed in a line in a vertical direction, but the number of reels is not limited to five. For example, the number of reels may be three or may be nine.

The slot machine 1 is a coin input type gaming machine that requires input of coins at the start of the game. However, the invention is also applicable to a gaming machine that requires the use of credits such as coins or the use of money information stored on a prepaid card at the start of the game.

In the invention, the game content is not limited to the slot game. For example, the invention may be applied to a card gaming machine that displays card images showing cards or a mahjong gaming machine that displays images showing mahjong tiles.

As the above, according the invention, there is provided a gaming machine, having a display unit that displays a game image for use in a game, including: an image data storage unit that stores general game image data including common image data that is common to a plurality of user countries in which to use the gaming machine and individual image data that differ from user country to user country; and a position changing unit that changes the display position of the game image displayed on the display unit, on a per user country basis, using the general game image data stored in the image data storage unit.

This gaming machine is configured such that, when user countries are designated, the display position of the game image is changed, for each of the designated user countries, using the general game image data stored in the image data storage unit.

Besides, the gaming machine further includes a reading unit that reads a user country code for identifying each of the user countries from an external storage medium storing the user country code, wherein the position changing unit can be configured to change the display position of the game image, based on the user country code read by the reading unit.

This gaming machine can use the external storage medium to input a user country code from the external, thus changing the display position of the game image in response to the user country code.

Further, according to the invention, there is provided a gaming machine, having a display unit that displays a game image for use in a game, including: an image data storage unit that stores common image data that is common to a plurality of user countries in which to use the gaming machine and individual image data that differ from user country to user country; and a layout changing unit that changes the display layout of the game image displayed on the display unit, using the common image data and any one of the individual image data, stored in the image data storage unit.

This gaming machine is configured such that, when any one of the individual image data stored in the image data storage unit is designated, the display layout of the game image is changed using the designated one of the individual image data and the common image data.

The gaming machine further includes a reading unit that reads a user country code for identifying each of the user countries from an external storage medium storing the user country code, wherein the layout changing unit can be configured to change the display layout of the game image, based on the user country code read by the reading unit.

This gaming machine, which can use the external storage medium to input a user country code from the external, is configured such that the display layout of the game image is changed using the common image data and individual image data corresponding to the user country code.

Besides, the invention provides a gaming machine, having a display unit that displays a game image for use in a game, including: an image data storage unit that stores common image data that is common to a plurality of user countries in which to use the gaming machine and individual image data that differ from user country to user country; a reading unit that reads a user country code for identifying each of the user countries from an external storage medium storing the user country code; and a layout setting unit that sets the display layout of the game image, on a per user country basis, using the common image data stored in the image data storage unit and any one of the individual image data corresponding to the user country code read by the reading unit.

This gaming machine, which can use the external storage medium to input a user country code from the external, is configured such that the display layout of the game image is changed using the common image data and individual image data corresponding to the user country code.

Further, according to the invention, there is provided a gaming machine having a display unit that displays a game image for use in a game, including: an image data storage unit that stores common image data for displaying on the display unit a common image which is common to a plurality of operation environments of the gaming machine and a plurality of individual image data for displaying on the display unit a plurality of individual images which are individually used for each of the operation environments of the gaming machine; an operation unit capable of performing the operation of entering identification information for specifying any of the operation environments; a specification unit that specifies at least one corresponding individual image data which corresponds to the identification information entered by the operation of the operation unit, out of the plurality of individual image data; a determination unit that determines a positional relationship, on the display unit, between the common image and a corresponding individual image based on the corresponding individual image data, in response to the identification information entered by the operation of the operation unit; and a display control unit that displays the game image in accordance with the positional relationship determined by the determination unit.

In this gaming machine, when identification information is entered by operation of the operation unit, corresponding individual image data which corresponds to the entered identification information, out of the individual image data stored in the image data storage unit, is specified. Besides, a positional relationship between the common image and a corresponding individual image which corresponds to the corresponding individual image data is determined. Thus, the game image is displayed to have the common image and the corresponding individual image, in accordance with the determined positional relationship.

The gaming machine can be configured to further include a specification information storage unit that stores, in a correlated relationship, the identification information entered through the operation unit and individual data codes for specifying the individual image data.

With such a configuration, the corresponding individual image data can be specified by referring to the specification information storage unit.

Besides, the invention provides a gaming machine having a display unit that displaying a game image for use in a game, including: a display mode storage unit that stores a plurality of display modes in which to display, on the display unit, a common image which is common to a plurality of operation environments of the gaming machine and at least any one of a plurality of individual images which are individually used for each of the operation environments of the gaming machine; an operation unit capable of performing the operation of entering identification information for specifying any of the operation environments; a mode specification unit that specifies a corresponding display mode which corresponds to the identification information entered by the operation of the operation unit, out of the plurality of display modes; and a display control unit that displays the game image in accordance with the corresponding display mode specified by the mode specification unit.

In this gaming machine, when identification information is entered through the operation unit, a corresponding display mode which corresponds to the entered identification information, out of the display modes stored in the display mode storage unit, is specified. Thus, the game image is displayed in accordance with the specified corresponding display mode.

In this gaming machine, the display mode storage unit can be configured to store, in a correlated relationship, the identification information entered through the operation unit and display mode codes for specifying the display modes.

With such a configuration, a corresponding display mode correlated with the identification information entered through the operation unit can be specified by referring to the display mode storage unit.

Furthermore, the invention provides a gaming machine having a display unit that displaying a game image for use in a game, including: a display control unit that performs display control of the display unit so as to secure in the display unit a common region capable of displaying a common image which is common to a plurality of operation environments of the gaming machine and position adjustment regions for use in adjusting the display position of the common image; and an operation unit capable of performing the operation of entering identification information for specifying any of the operation environments, wherein the display control unit displays at least any one of individual images in a corresponding region which corresponds to the identification information entered by the operation of the operation unit, out of the position adjustment regions, and displays the common image in the common region or in a region other than the common region and the corresponding region of the position adjustment regions.

In this gaming machine, the common region and the position adjustment regions are secured in the display unit. And, when identification information is entered through the operation unit, a corresponding region which corresponds to the entered identification information, out of the position adjustment regions, is specified. Thus, at least any one of the individual images is displayed in the specified corresponding region, whereas the common image is displayed in the common region or in a region other than the common region and the corresponding region of the position adjustment regions.

Besides, preferably, this gaming machine further includes a position code storage unit that stores, in a correlated relationship, the identification information entered through the operation unit and position codes for specifying the position adjustment regions.

With such a configuration, a corresponding region which corresponds to the identification information entered through the operation unit can be specified by referring to the position code storage unit.

The aforesaid gaming machine can be configured to further include an image data storage unit that stores common image data for displaying the common image on the display unit and a plurality of individual image data for displaying the plurality of individual images on the display unit.

With such a configuration, the game image can be displayed using the common image data stored in the image data storage unit and the individual image data.

As described in detail above, according to the invention, in a gaming machine which includes a display unit that displays a game image and in which a game proceeds using the game image displayed on the display unit, an each country's individualized response to the game image is eliminated, thus making it possible to shorten a development period and reduce cost.

As described in detail above, according to the invention, in a gaming machine which includes a display unit that displays a game image and in which a game proceeds using the game image displayed on the display unit, an individualized response to the game image for each of operation environments, such as a gaming machine installation site, installation time, and operation start time, is eliminated, thus making it possible to shorten a development period and reduce cost.

What is claimed is:

1. A gaming machine comprising:

a display unit including a game display region, in which a game image used in a game played on the gaming machine is displayed, and a plurality of country-specific display regions, in which country-specific data is displayed;

an image data storage unit that stores common image data that is common to a plurality of user countries in which the gaming machine is used, and individual image data that differ from user country to user country;

a position changing unit that selects one of the country-specific display regions for displaying country-specific data and that changes position on the display unit of the game display region, on a per user country basis, based on the country in which the gaming machine is to be played, using the common image data and a selected one of the individual image data stored in the image data storage unit: and a reading unit that reads user country codes identifying each of the user countries and that reads a specific country code from an external storage medium storing the specific user country storage medium being supplied to the reading unit, wherein the position changing unit sets the display position of the game display region based on the specific user country code read by the reading unit, and the position changing unit changes the display position of the game display region, on a per user country basis, using the common image data stored in the e image data storage unit and the one of the individual image data corresponding to the specific user country code read by the reading unit.

* * * * *